United States Patent
Kras et al.

(10) Patent No.: US 12,447,678 B2
(45) Date of Patent: Oct. 21, 2025

(54) DISTRIBUTED FLUX ARRAY

(71) Applicant: Seurat Technologies, Inc., Wilmington, MA (US)

(72) Inventors: Susanne Kras, Chelmsford, MA (US); James A. DeMuth, Woburn, MA (US); Andrew J. Bayramian, Marblehead, MA (US); Francis L. Leard, Sudbury, MA (US); Drew W. Kissinger, Carlisle, MA (US); Cote LeBlanc, Malden, MA (US)

(73) Assignee: Seurat Technologies, Inc., Wilmington, MA (US)

( * ) Notice: Subject to any disclaimer, the term of this patent is extended or adjusted under 35 U.S.C. 154(b) by 14 days.

(21) Appl. No.: 18/524,944

(22) Filed: Nov. 30, 2023

(65) Prior Publication Data

US 2024/0109252 A1  Apr. 4, 2024

Related U.S. Application Data

(63) Continuation of application No. 17/506,425, filed on Oct. 20, 2021, now Pat. No. 11,872,760.

(60) Provisional application No. 63/107,100, filed on Oct. 29, 2020.

(51) Int. Cl.
*B29C 64/282* (2017.01)
*B29C 64/153* (2017.01)
*B29C 64/268* (2017.01)
*B33Y 10/00* (2015.01)
*B33Y 30/00* (2015.01)

(52) U.S. Cl.
CPC .......... *B29C 64/282* (2017.08); *B29C 64/153* (2017.08); *B29C 64/268* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 2009/0040595 A1 | 2/2009 | De Samber | |
| 2012/0298886 A1* | 11/2012 | Petersen | B33Y 30/00 250/492.1 |
| 2018/0326664 A1* | 11/2018 | DeMuth | B29C 64/153 |
| 2020/0023467 A1 | 1/2020 | Hunze | |

FOREIGN PATENT DOCUMENTS

| EP | 3470209 A1 | 4/2019 |
|---|---|---|
| WO | 2017132664 | 8/2017 |

\* cited by examiner

*Primary Examiner* — Alexander M Weddle
(74) *Attorney, Agent, or Firm* — David R. Stevens; Stevens Law Group

(57) ABSTRACT

An apparatus includes at least one laser source and a print bed. A light valve array having at least three optically addressable light valves is positioned to direct differing images at the print bed. Optics to direct multiple beams derived from the at least one laser source can be positioned to direct light toward and from the optically addressable light valves.

16 Claims, 24 Drawing Sheets

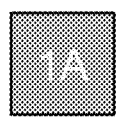
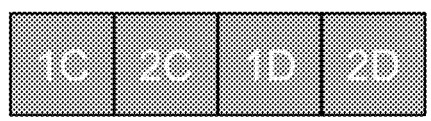
Fig. 19A          Fig. 19B
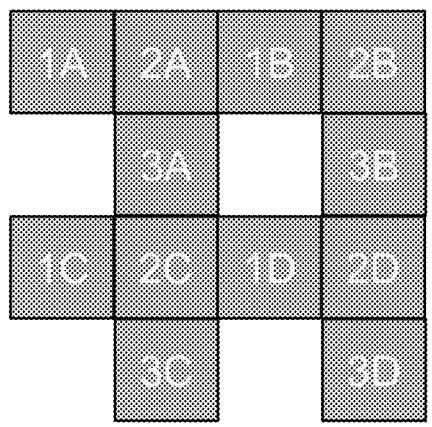
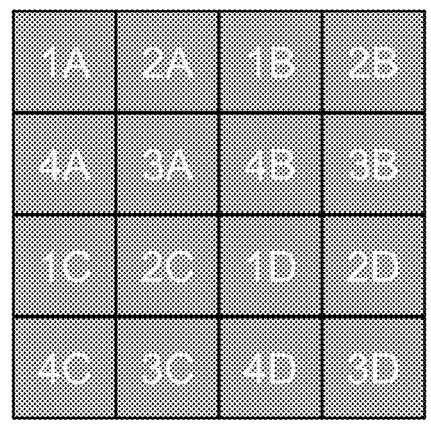
Fig. 19C          Fig. 19D

DISTRIBUTED FLUX ARRAY

RELATED APPLICATION

This application is a continuation of U.S. patent application Ser. No. 17/506,425, filed Oct. 20, 2021, which claims the priority benefit of U.S. Patent Application No. 63/107,100, filed on Oct. 29, 2020, both of which are incorporated by reference in their entirety.

TECHNICAL FIELD

The present disclosure generally relates to increasing energy in an additive manufacturing system. This can include splitting the incoming illumination beams between two or more optically addressable light valves (OALV), each imprinting the same image on the beam. The images can be superimposed or overlaid to form a single image, or alternatively used to form a distributed image.

BACKGROUND

In the field of metal additive manufacturing (AM), the incoming optical field can be a high fluence laser source. Unfortunately, such industrial applications require that optically addressable light valves withstand high fluence laser sources for a prolonged period of time so as to allow the production of multiple build cycles within a typical shot count in the tens of millions to billions. The energy required to print materials in a reasonable time can exceed 8 J/cm$^2$ at the print plane. While various methods can be used to reduce the fluence at the optically addressable light valves, commercially practicable industrial processing requires that the energy density at the optically addressable light valves to be not less than 2 J/cm$^2$. Existing optically addressable light valves fail at far below this fluence, making techniques for reducing optical light valve damage necessary.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIGS. 19A-D illustrate examples of printing with a distributed pattern of tiles;

DETAILED DESCRIPTION

Figure 1:
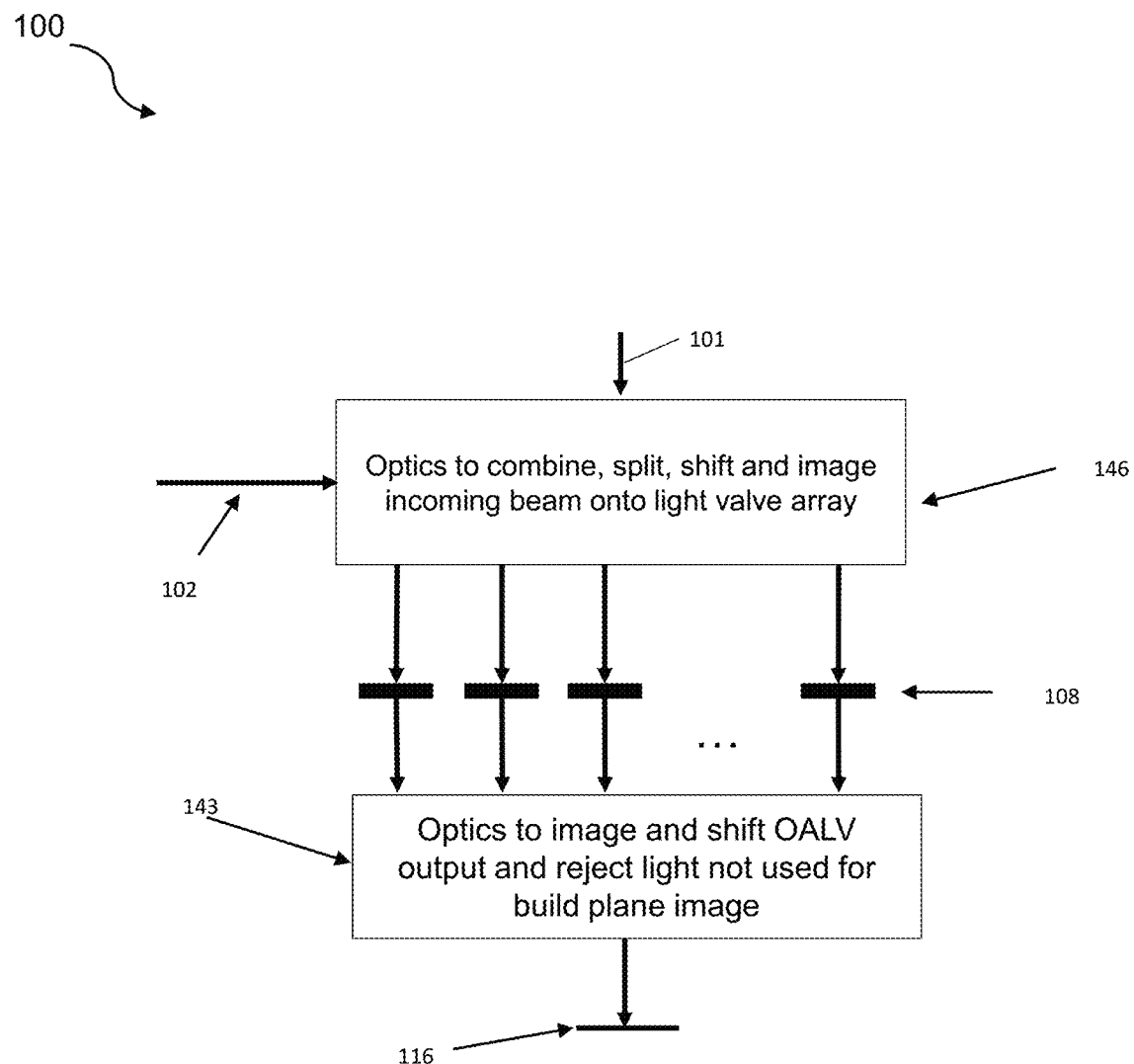
FIG. 1 illustrates a system to combine, split and image the incoming illumination beams onto each element of the transmissive light valve array, then image and shift the beams exiting from each light valve to form the desired configuration of image tiles at the build plane.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

In the following disclosure, improvements can include using at least one laser source and a print bed. A light valve array having at least three optically addressable light valves is positionable to direct differing images at the print bed. Optics are used to direct multiple beams derived from the at least one laser source onto the optically addressable light valves.

In some embodiments, the images directed at the print bed are a plurality of tiles meshed and/or matched together at their edges to form a single image.

In some embodiments, the images directed at the print bed are overlapped together at their edges to form a single image.

In some embodiments, the differing images are relayed to individual beam steering units positioned between the light valve array the print bed.

In some embodiments, the at least one laser source further comprises at least two laser sources of different wavelength.

In some embodiments, an additive manufacturing method includes providing at least one laser source and a print bed and arranging a light valve array having at least three optically addressable light valves to direct differing images at the print bed. Optics can be used to direct multiple beams derived from the at least one laser source onto the optically addressable light valves.

In some embodiments, an additive manufacturing system includes multiple laser sources providing multiple laser beams and a print bed. A light valve array having multiple optically addressable light valves is able to direct differing two-dimensional images at the print bed and optics are positioned to direct the multiple laser beams derived from the multiple laser sources onto the multiple optically addressable light valves.

In some embodiments the optics can combine multiple laser beams before directing the laser beams onto the multiple optically addressable light valves.

In some embodiments the optics can split at least some of the multiple laser beams before directing the laser beams onto the multiple optically addressable light valves.

In some embodiments secondary optics can be positioned that can modify two-dimensional images after interaction with the multiple optically addressable light valves.

In some embodiments at least some of the two-dimensional images from the light valve array are superimposed at the print bed.

In some embodiments an additive manufacturing method includes providing multiple laser sources providing multiple laser beams directable at a print bed. A light valve array having multiple optically addressable light valves is arranged to direct differing two-dimensional images at the print bed. Optics are used to direct the multiple laser beams derived from the multiple laser sources onto the multiple optically addressable light valves.

FIG. 1 illustrates a system 100 to combine, split and image the incoming illumination beams onto each element of the transmissive light valve array, then image and shift the beams exiting from each light valve to form the desired configuration of image tiles at the build plane. In this embodiment, incoming illumination beams 101 and 102 are combined, split, and imaged by optics 146 onto each element of the M×N light valve array 108. In some embodiments, images can include a plurality of tiles meshed and/or matched together at their edges to form a single image. Alternatively or in addition, the images directed at the print bed can include a plurality of tiles overlapped together at their edges and that still form a single image. In another embodiment, if there is only one input beam 101, the optics 146 will split, shift, and image the single input beam 101 onto each element of the M×N light valve array 108. The optics 143 shift and image the beams from each element of the M×N light valve array 208 and reject unwanted light from each beam to form the final image at the build plane 116. The optics 146 and 143 can be lenses, prisms, diffractive optics, holographic optics, metamaterial lenses, or some combination of these.

Figure 2:
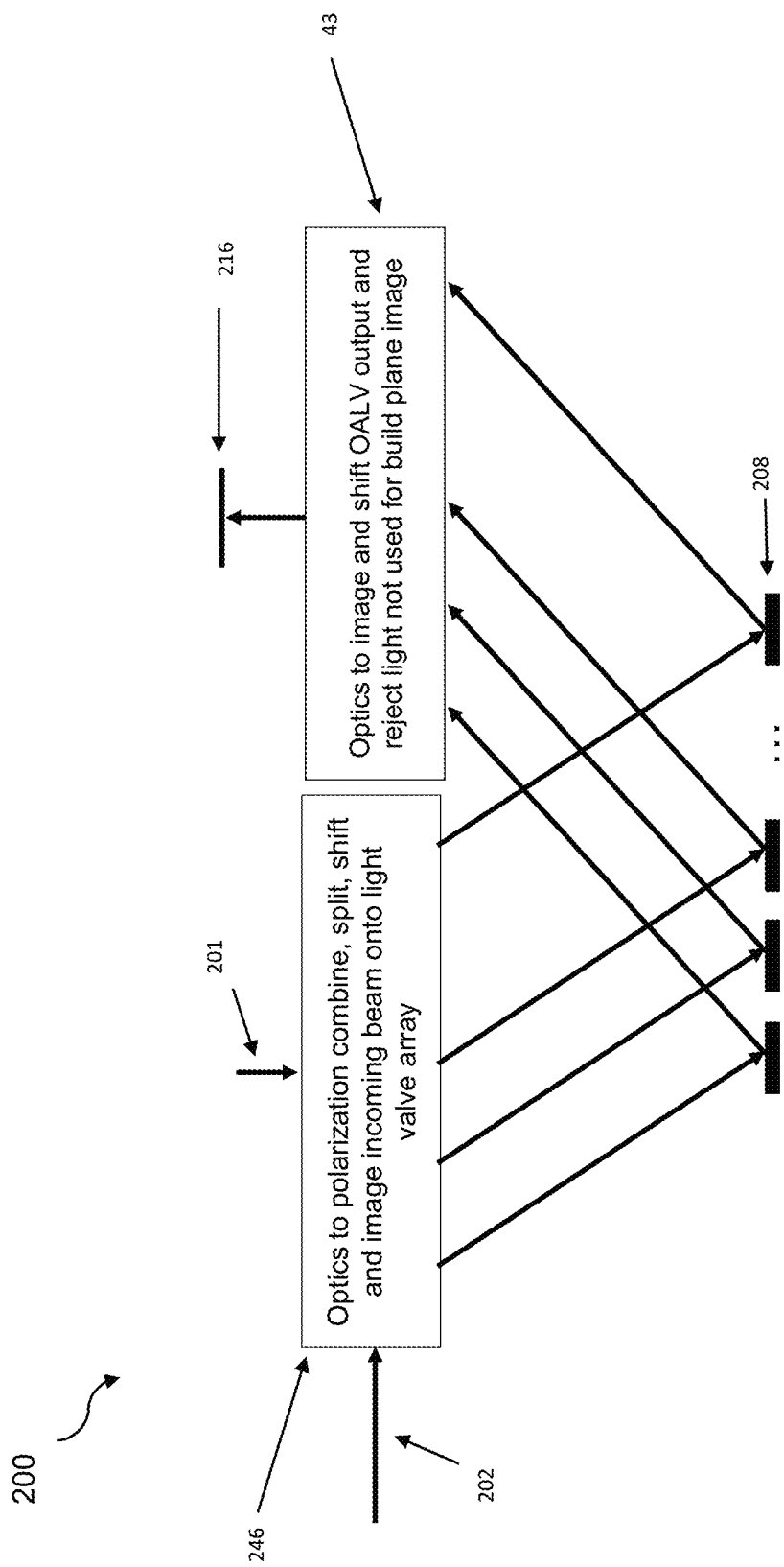
FIG. 2 illustrates a system to combine, split and image the incoming illumination beams onto each element of the reflective light valve array, then image and shift the beams exiting from each light valve to form the desired configuration of image tiles at the build plane.

FIG. 2 illustrates a system 200 to combine, split and image the incoming illumination beams onto each element of the reflective light valve array, then image and shift the beams exiting from each light valve to form the desired configuration of image tiles at the build plane. In this embodiment, incoming illumination beams 201 and 202 are combined, split, and imaged by optics 246 onto each element of the M×N light valve array 208. If there is only one input beam 1, the optics 246 will split, shift, and image the single input beam 201 onto each element of the M×N light valve array 208. The optics 243 shift and image the beams 209 from each element of the M×N light valve array 208 and reject unwanted light from each beam to form the final image at the build plane 216. The optics 246 and 243 can be lenses, prisms, diffractive optics, holographic optics, metamaterial lenses, or some combination of these.

Figure 3:
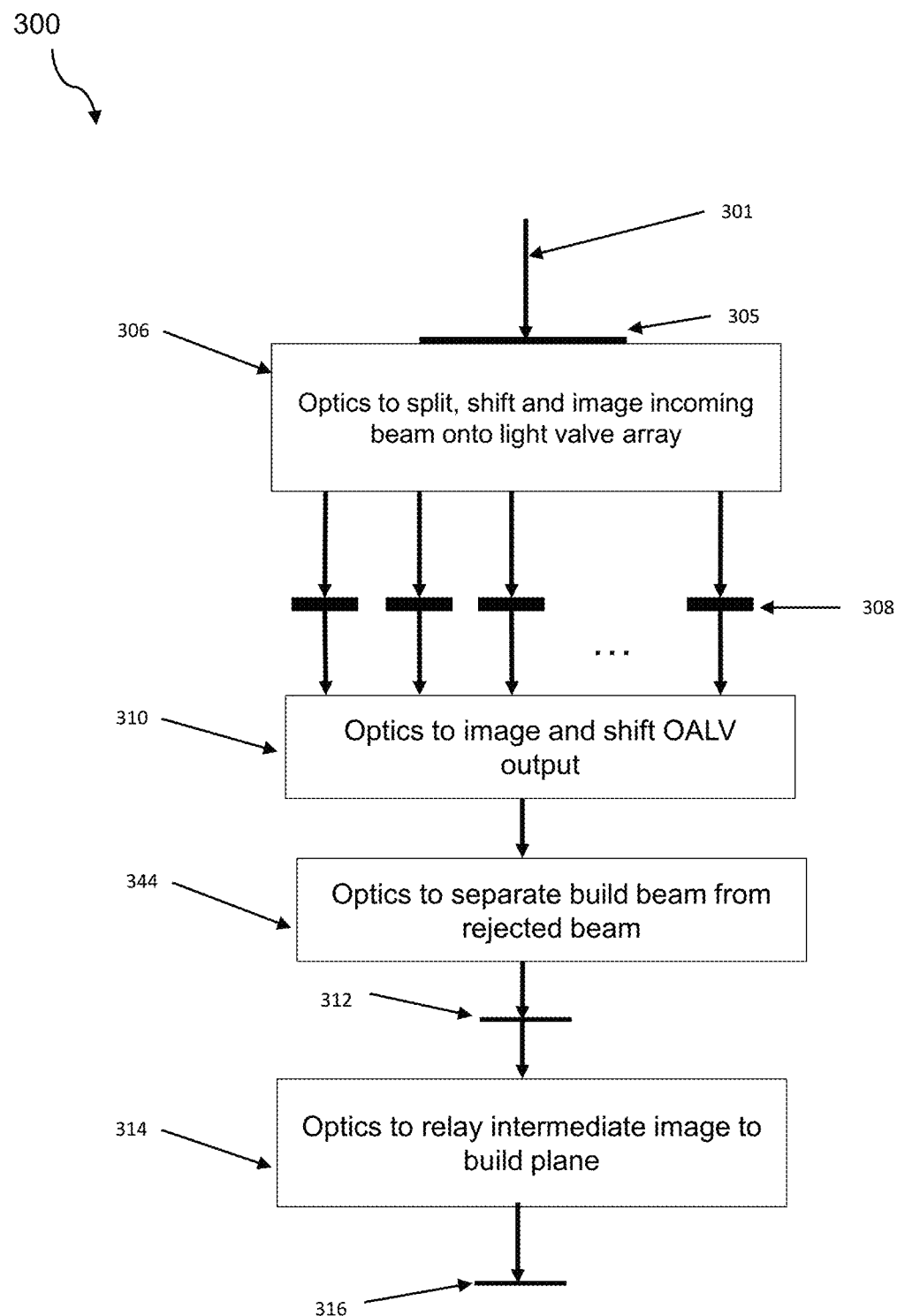
FIG. 3 illustrates a system to split and image the incoming illumination beam onto each element of the light valve array (which can be transmissive or reflective), then image and shift the beams exiting from each light valve to form the desired configuration of image tiles at the build plane.

FIG. 3 illustrates a system 300 to split and image the incoming illumination beam onto each element of the light valve array (which can be transmissive or reflective), then image and shift the beams exiting from each light valve to form the desired configuration of image tiles at the build plane. In this embodiment, incoming illumination beam 301 is split, shifted and imaged onto each element of the light valve array 308 by optics 306. The optics 306 receive an incident image plane 305 of the input beam 301. The optics 306 split, shift and image the beams onto each element of the M×N light valve array 308. The optics shift and image the beams from each element of the M×N light valve array 308 and reject unwanted light from each beam to form the final image at a build plane 316. The optics 306 can be lenses, prisms, diffractive optics, holographic optics, metamaterial lenses, or some combination of these. The image at the build plane 316 can be a large composite tile or a distributed group of tiles. The optics after M×N light valve array 308 are comprised of elements 310 that image and shift the light valve array output beams to print a large composite tile or a distributed pattern of tiles at an optional intermediate image plane 312. Optics 314 relay the intermediate image to the build plane 316. There are optical elements 344 after the M×N light valve array 308 to reject light that will not be used for printing from each beam. These optical elements 344 can be polarizers or dichroic filters. They are shown between the imaging and shifting optics 310 and the intermediate image plane 312 but can be located anywhere between the M×N light valve array 308 and the image at the build plane 316. If there is no intermediate image plane 312, then the optics 310 will image the beams directly to the build plane 316.

Figure 4:
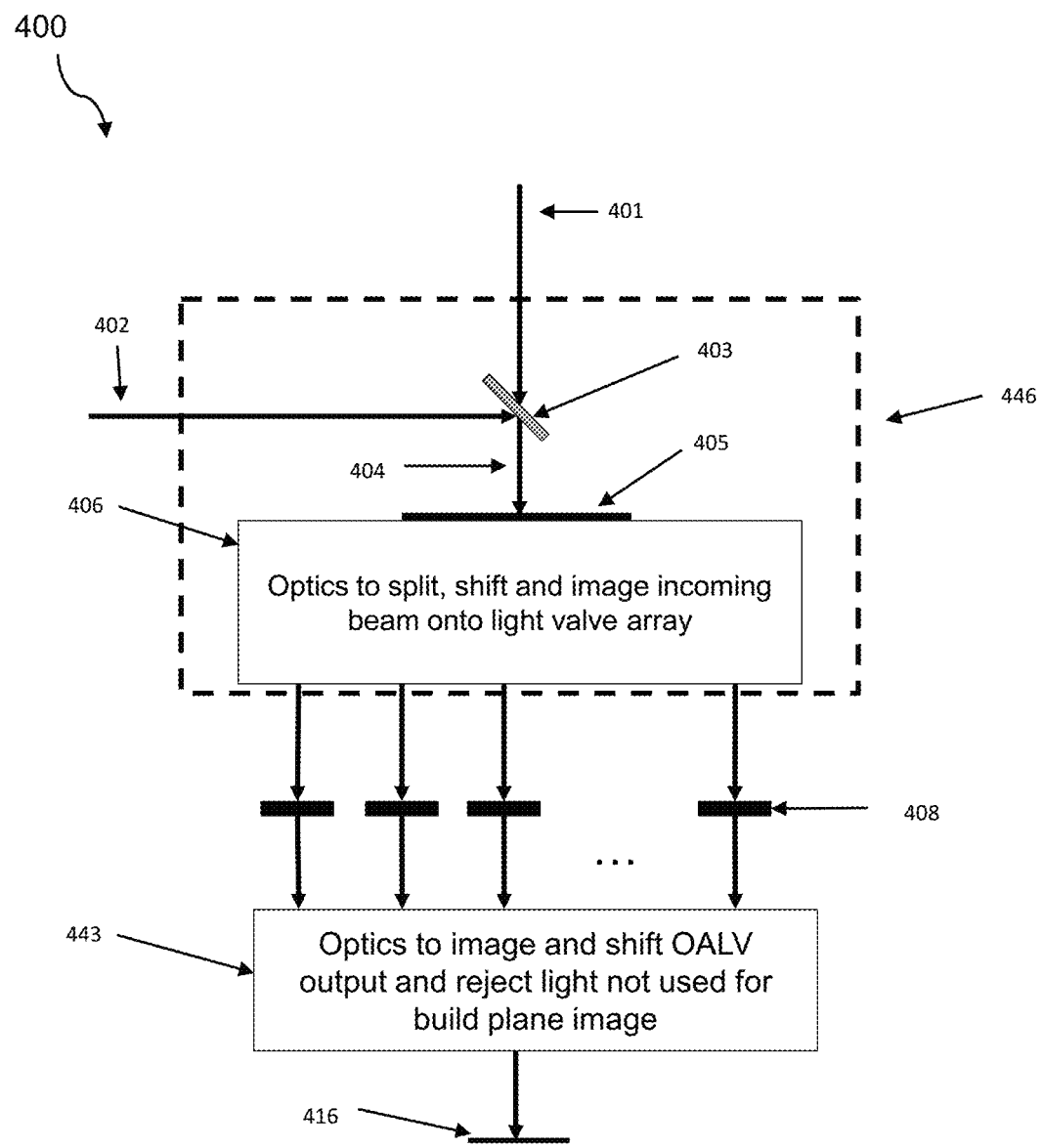
FIG. 4 illustrates a system to combine incoming illumination beams, split and image the combined incoming illumination beam onto each element of the light valve array (which can be transmissive or reflective), then image and shift the beams exiting from each light valve to form the desired configuration of image tiles at the build plane.

FIG. 4 illustrates a system 400 to combine incoming illumination beams, split and image the combined incoming illumination beam onto each element of the light valve array (which can be transmissive or reflective), then image and shift the beams exiting from each light valve to form the desired configuration of image tiles at the build plane. In this embodiment, incoming illumination beams 401 and 402, which can have different wavelengths, are superimposed, then split, shifted and imaged by optics 446. The optics 446 are comprised of a combiner optical element 403 to combine the input beams 401 and 402 and optics 406 to split, shift, and image 405 the combined beam 404 onto the input of optics 406, which in turn split, shift and image the combined beams onto each element of a M×N light valve array 408. The combiner optical element 403 can be a polarizer or dichroic filter. The optics 443 shift and image the beams from each element of the M×N light valve array 408 and reject unwanted light from each beam to form the final image at the build plane 416. The image at the build plane 416 can be a large composite tile or a distributed pattern of tiles.

Figure 5:
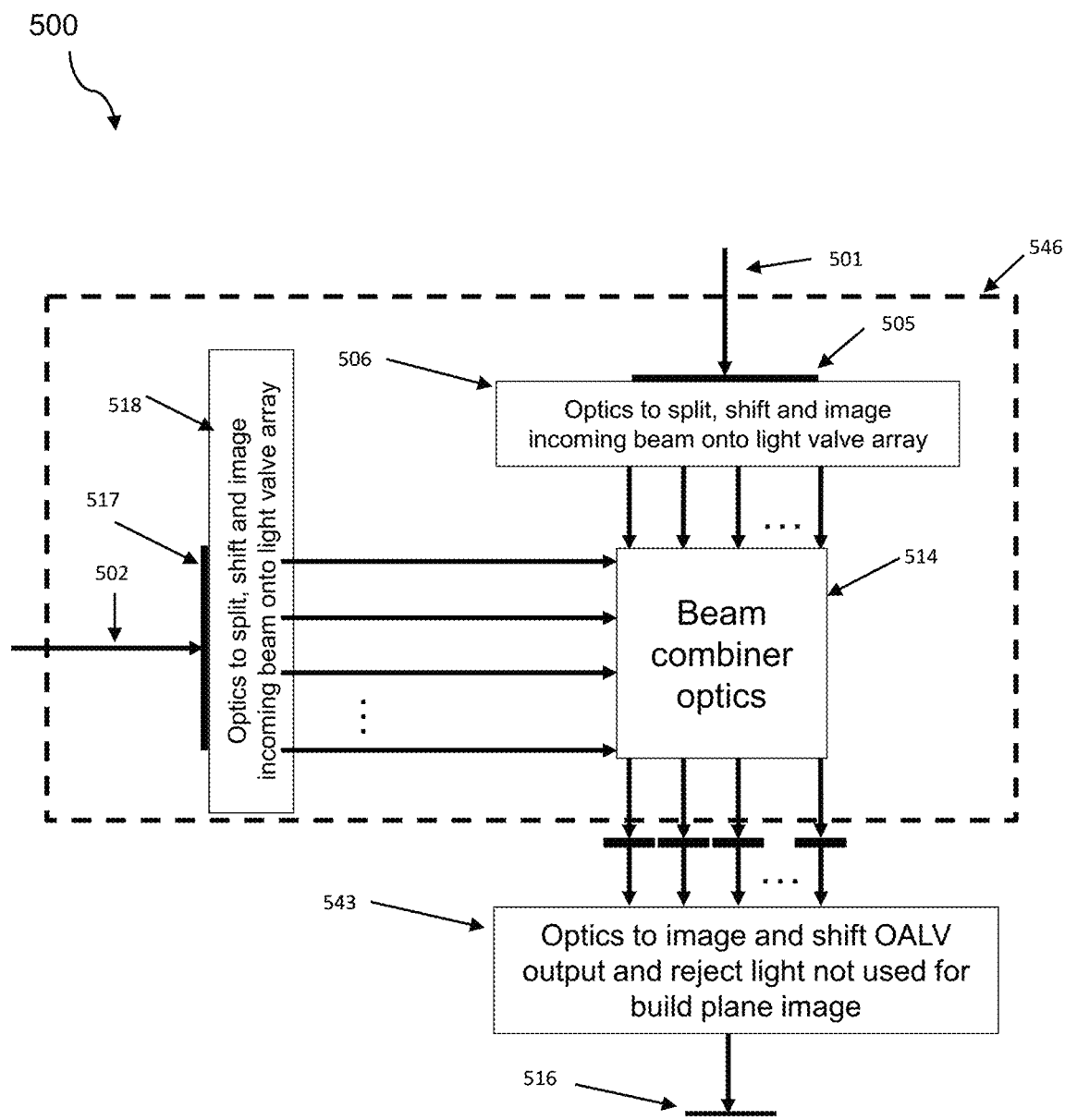
FIG. 5 illustrates a system to split each of two incoming illumination beams into an M×N array of beams, overlay the incoming illumination beam arrays using one or more optical combiners, and image each combined beam onto an element of the light valve array (which can be transmissive or reflective). The output from each light valve is imaged and shifted to form the desired configuration of image tiles at the build plane.

FIG. 5 illustrates a system 500 to split each of two incoming illumination beams into an M×N array of beams, overlay the incoming illumination beam arrays using one or more optical combiners, and image each combined beam onto an element of the light valve array (which can be transmissive or reflective). In this embodiment, output from each light valve is imaged and shifted to form the desired configuration of image tiles at the build plane. The incoming illumination beams 501 and 502, which can have different wavelengths, are then split, shifted and imaged, then superimposed by optics 546. The incoming illumination beam 501 forms an image 505 at the input plane of the optics 506 used to split, shift, and image the separated beam onto a M×N light valve array 508. Another incoming illumination beam 502 forms an image 517 at the input plane of the optics 518 used to split, shift, and image the separated beams 13 onto the M×N light valve array 508. Each of the M×N beams from source 501 is combined with the corresponding beam from source 502 using beam combiner optics 514. The combiner optics 514 can be polarizers or dichroic filters. The combiner optics 514 can be a single combiner for all beams or multiple combiners. The M×N array of combined beams forms an image to illuminate each element of the M×N light valve array 508. The optics 543 shift and image the beams from each element of the M×N light valve array 508 and reject unwanted light from each beam to form the final image at a build plane 516. The image at the build plane 516 can be a large composite tile or a distributed pattern of tiles.

Figure 6:
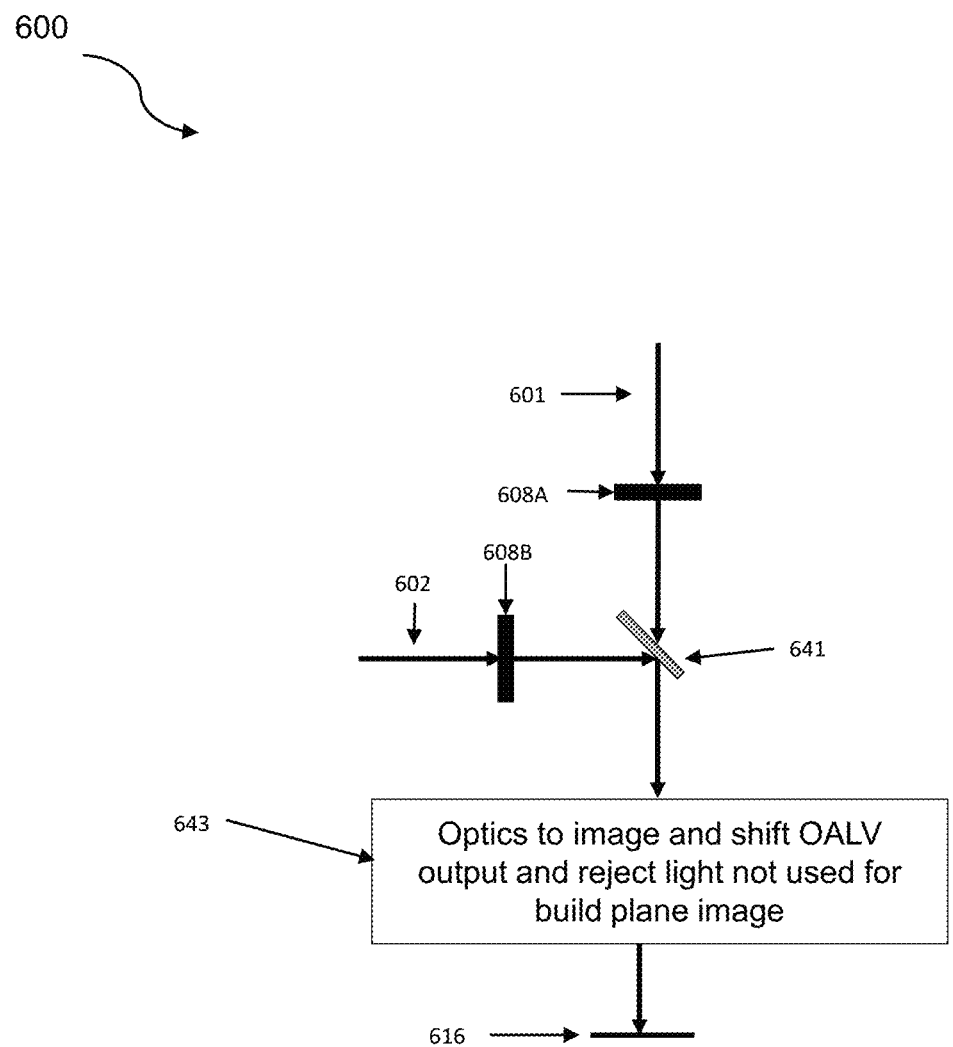
FIG. 6 illustrates a system to illuminate two independently controlled transmissive light valves with two different sources, then superimpose the images and relay them to the build plane.

FIG. 6 illustrates a system 600 to illuminate two independently controlled transmissive light valves with two different sources, then superimpose the images and relay them to the build plane. In this embodiment, incoming illumination beams 601 and 602 respectively illuminate light valves 608A and 608B. The output beams from the light valves 608A and 608B are superimposed on each other at optical combiner 641. The optical combiner 641 can be a polarizer or dichroic filter. The optics 643 shift and image the beam from the optical combiner 641 and reject unwanted light from each beam to form the final image at a build plane 616. The image at the build plane 616 can be a large composite tile or a distributed pattern of tiles. The characteristics of the incoming beams 601 and 6022 (which include wavelength, pulse length, intensity) can be independently adjusted to minimize laser damage for each light valve 608A and 608B.

Figure 7:
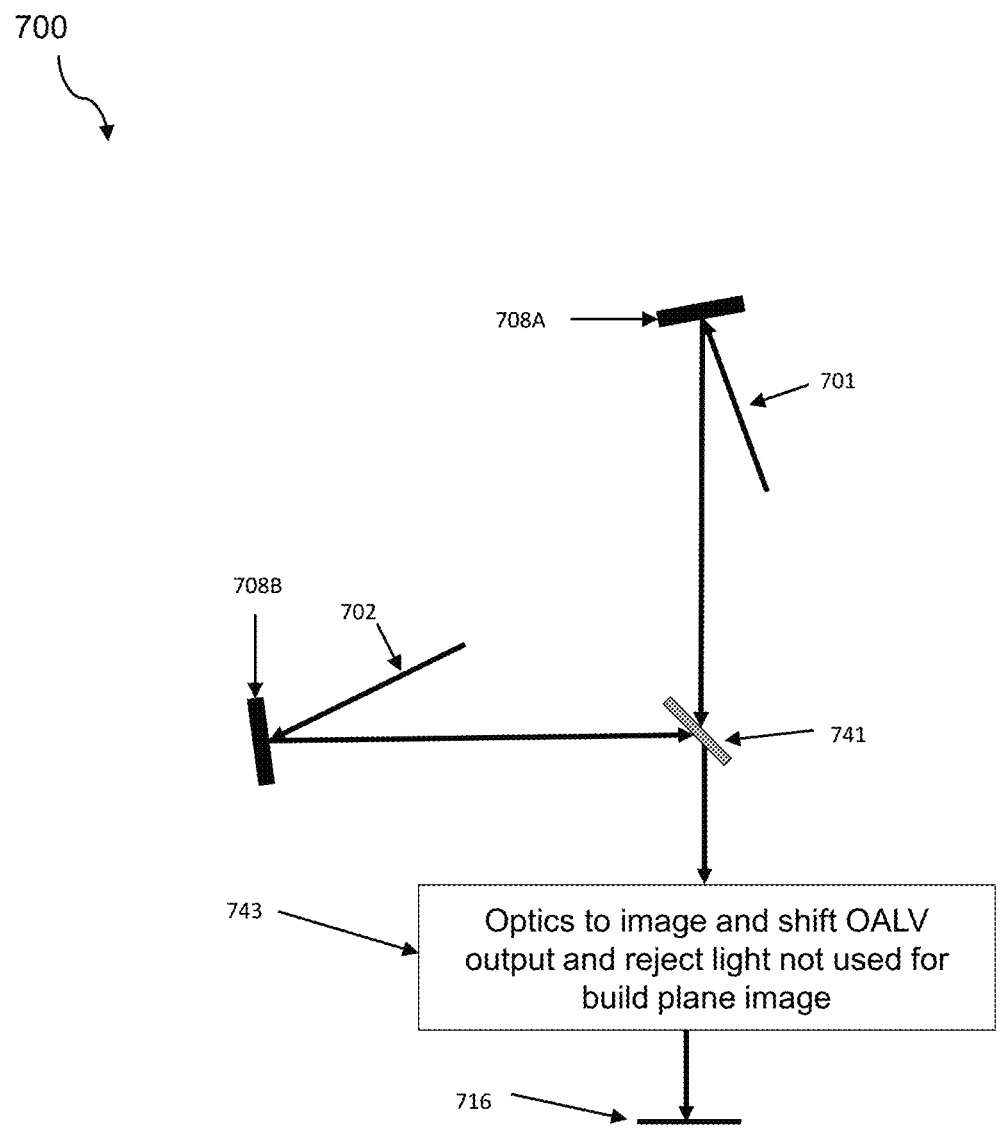
FIG. 7 illustrates a system to illuminate two independently controlled reflective light valves with two different sources, then superimpose the images and relay them to the build plane.

FIG. 7 illustrates a system 700 to illuminate two independently controlled reflective light valves with two different sources, then superimpose the images and relay them to the build plane. In this embodiment, incoming illumination beams 701 and 702 each respectively illuminate light valves 708A and 708B. The output beams from the light valves 708A and 708B are superimposed on each other at optical combiner 741. The optical combiner 741 can be a polarizer or dichroic filter. The optics 743 shift and image the beam 742 from the optical combiner 741 and reject unwanted light from each beam to form the final image at a build plane 716. The image at the build plane 716 can be a large composite tile or a distributed pattern of tiles. The characteristics of the incoming beams 701 and 702 (which include wavelength, pulse length, intensity) can be independently adjusted to minimize laser damage for each light valve 708A and 708B.

Figure 8:
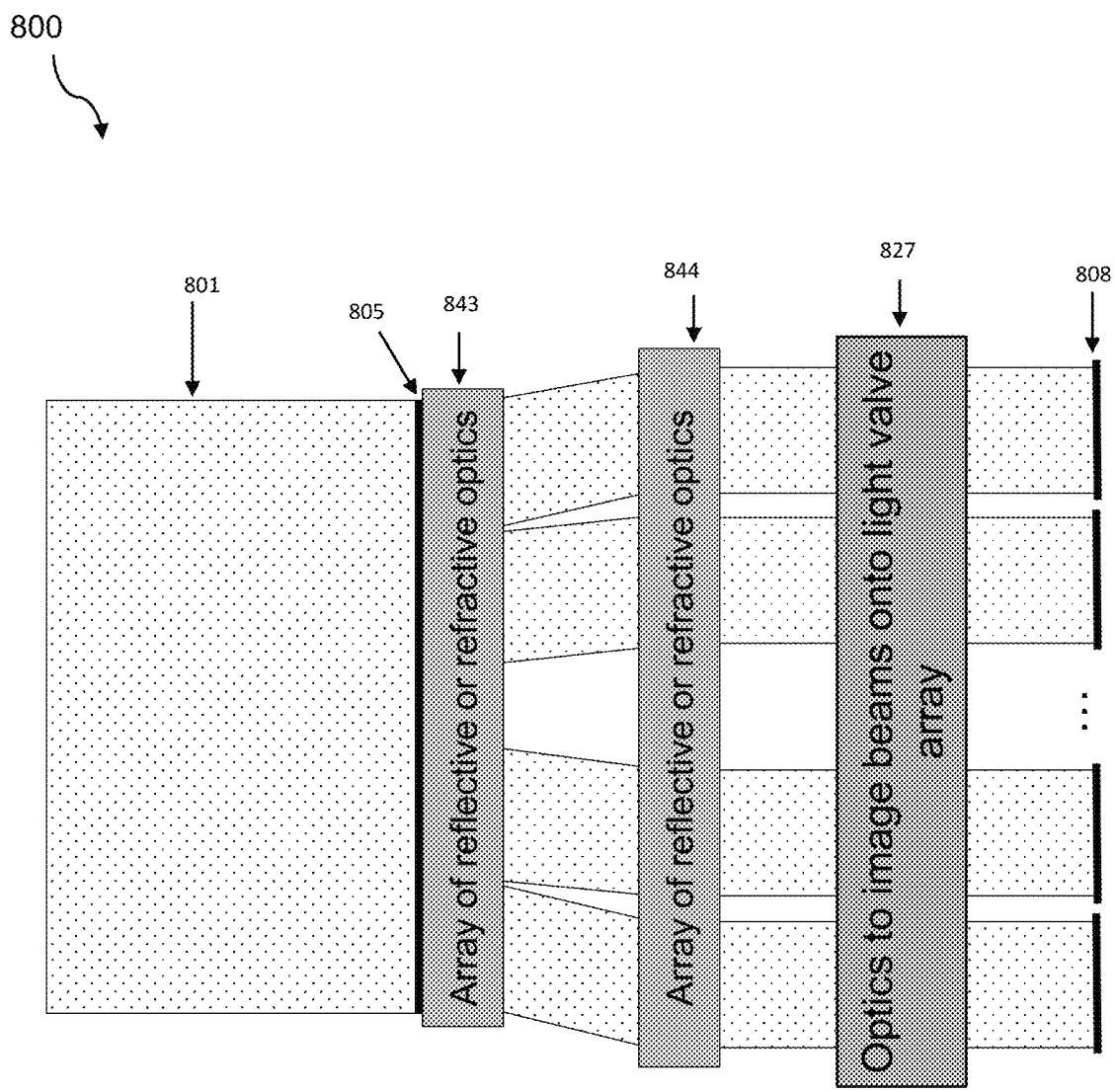
FIG. 8 illustrates a system to split an incoming beam into multiple beams using arrays of reflective or refractive optical elements, then image the beams onto multiple light valves.

FIG. 8 illustrates a system 800 to split an incoming beam into multiple beams using arrays of reflective or refractive optical elements, then image the beams onto multiple light valves. In this embodiment, incoming beam 801 has an image plane 805 at an M×N array of optical elements 843. The array of M×N optical elements 843 splits the input beam into M×N beams which are redirected by a second array of M×N optical elements 844 into parallel beams. If the optics in arrays 843 and 844 have no optical power, separate optics 827 are used to image the beams to an image plane on a light valve array 808. Otherwise, the optical power of the elements in the arrays 843 and 844 will form the images on each element in the light valve array 808.

Figure 9:
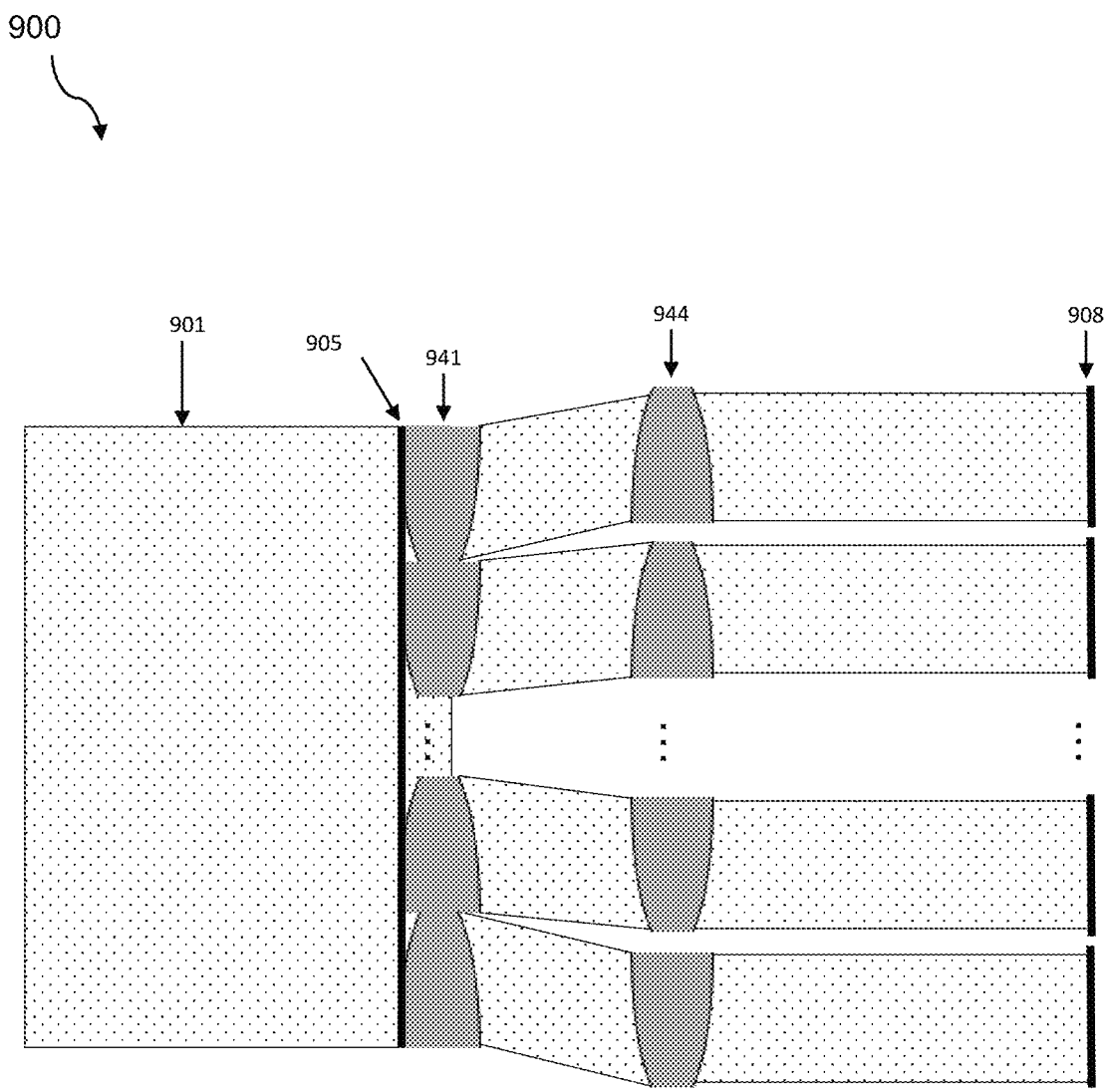
FIG. 9 illustrates a system to split an incoming beam into multiple beams using lens arrays, then image the beams onto multiple light valves.

FIG. 9 illustrates a system 900 to split an incoming beam into multiple beams using lens arrays, then image the beams onto multiple light valves. In this embodiment, incoming beam 901 has an image plane 905 at a lens array 921. The lens array 921 splits the input beam into multiple beams which are redirected by a second lens array 923 into parallel beams which are imaged on a light valve array 908. The magnification of the images incident on the light valve array is determined by the relative focal lengths of the lens elements in the two lens arrays 921 and 923.

Figure 10:
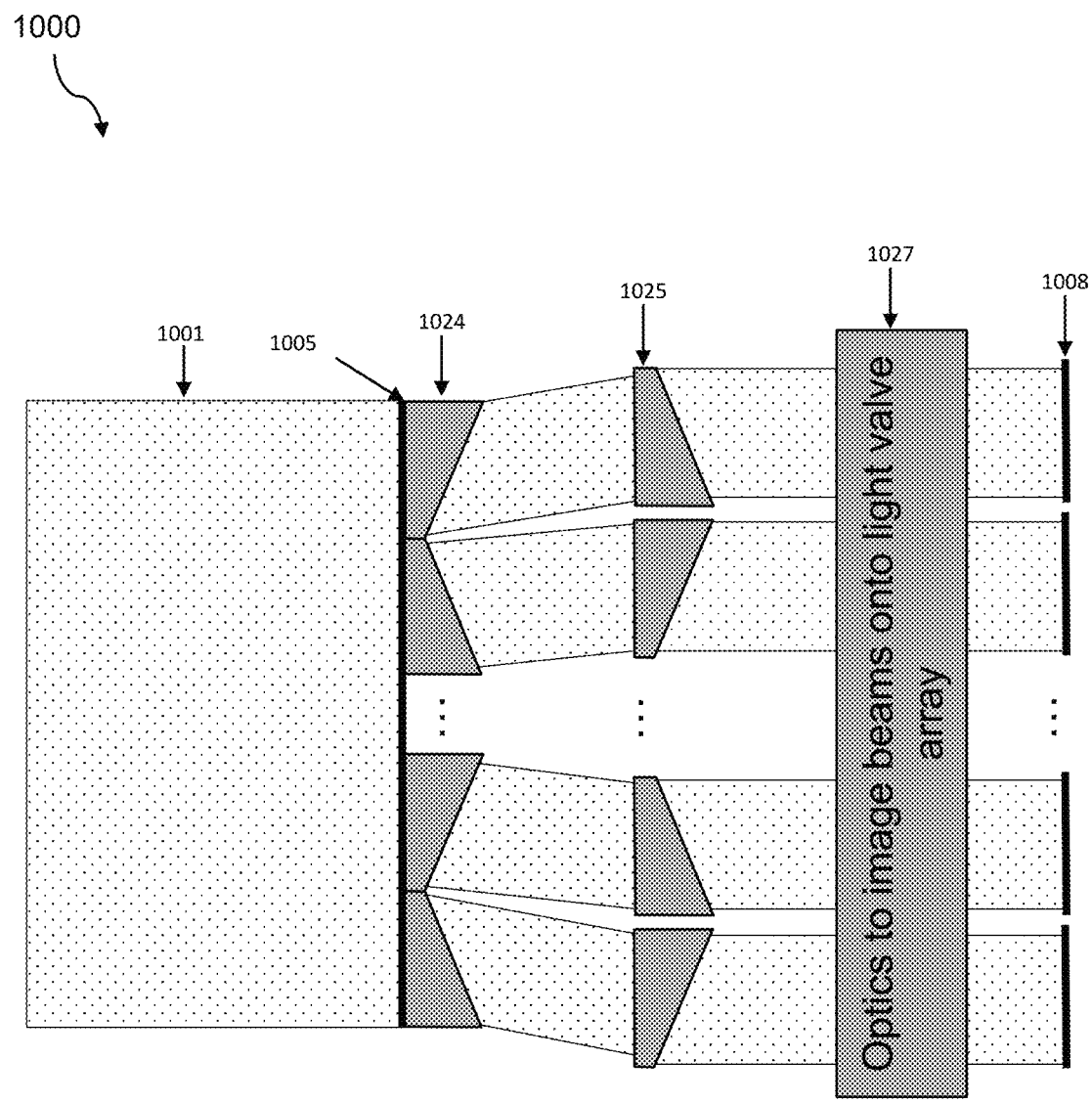
FIG. 10 illustrates a system to split an incoming beam into multiple beams using arrays of prisms, then image the beams onto multiple light valves.

FIG. 10 illustrates a system 1000 to split an incoming beam into multiple beams using arrays of prisms, then image the beams onto multiple light valves. In this embodiment, incoming beam 1001 has an image plane 1005 at a prism array 1024. The prism array splits the input beam into multiple beams which are redirected by a second prism array 1025 into parallel beams. Optics 27 are used to image the beams 26 onto each element of a light valve array 1008.

Figure 11:
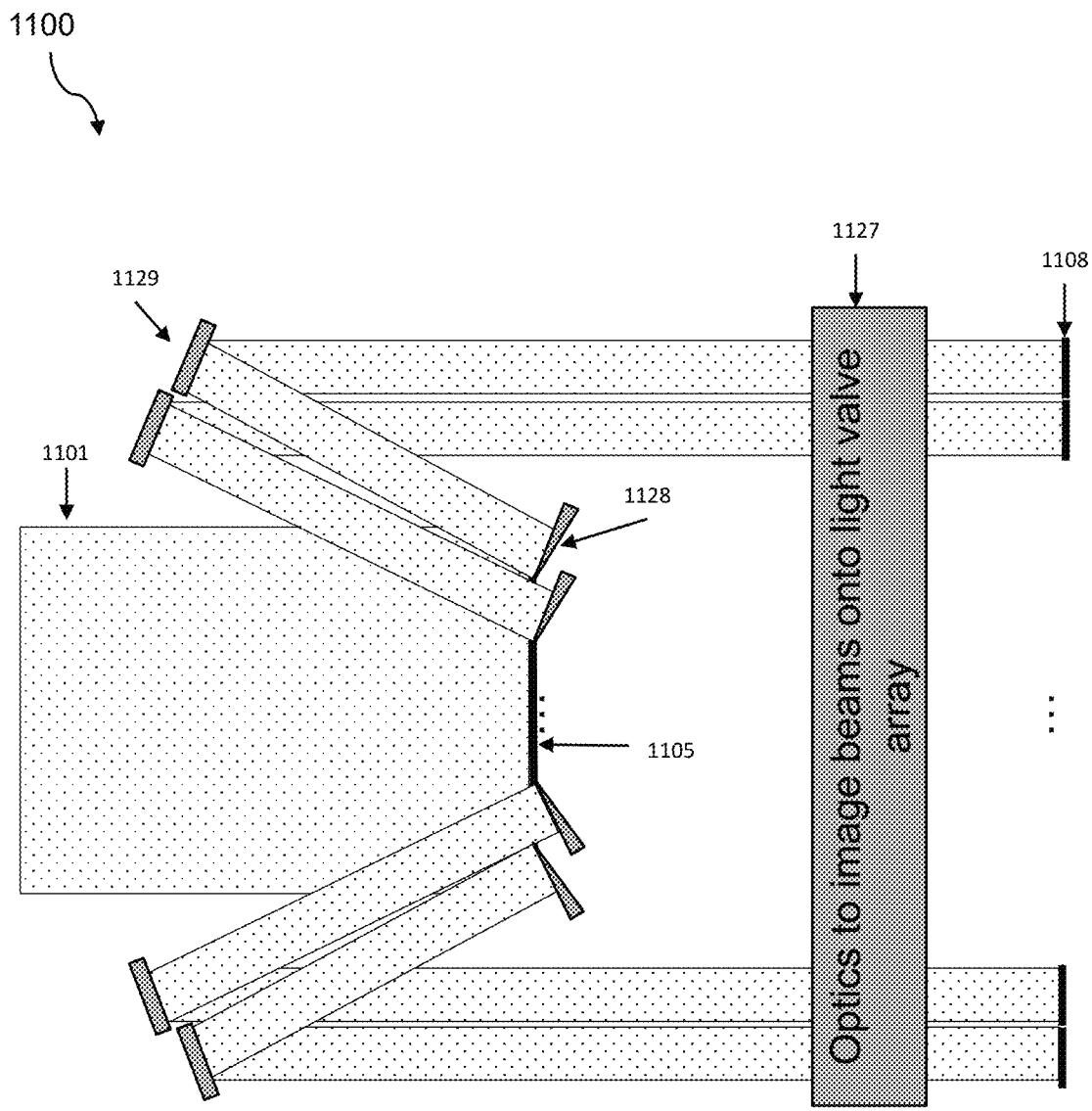
FIG. 11 illustrates a system to split an incoming beam into multiple beams using arrays of mirrors, then image the beams onto multiple light valves.

FIG. 11 illustrates a system 1100 to split an incoming beam into multiple beams using arrays of mirrors, then image the beams onto multiple light valves. In this embodiment, incoming beam 1101 has an image plane 1105 at a mirror array 1128. The mirror array 1128 at image plane 1105 redirects portions of the input beam into multiple beams which are redirected by a second mirror array 1129 into parallel beams. Optics 1127 are used to image the beams onto each element of a light valve array 1108.

Figure 12:
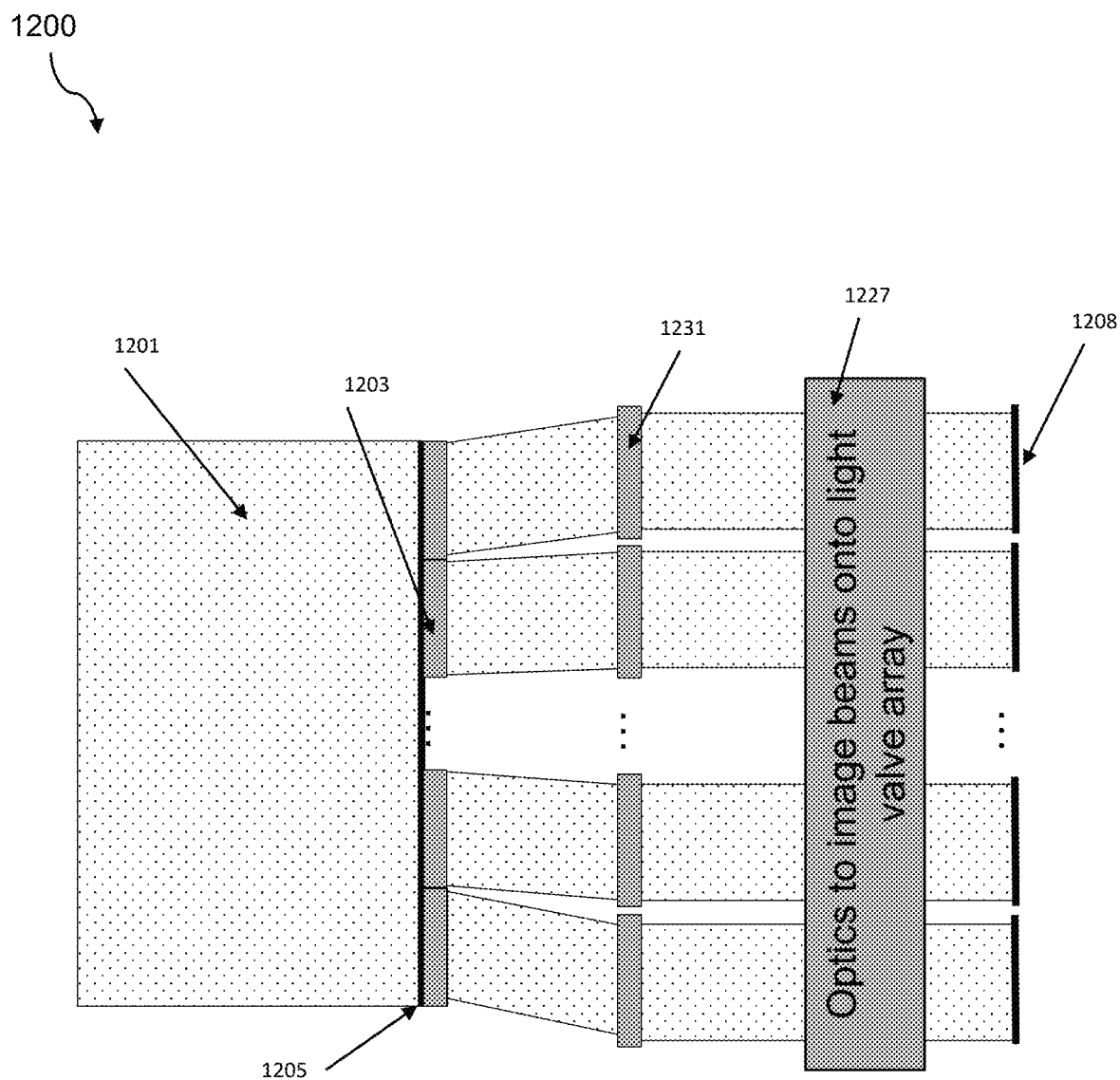
FIG. 12 illustrates a system to split an incoming beam into multiple beams using arrays of diffractive optical elements, then image the beams onto multiple light valves.

FIG. 12 illustrates a system 1200 to split an incoming beam into multiple beams using arrays of diffractive optical elements, then image the beams onto multiple light valves. In this embodiment, incoming beam 1201 has an image plane 1205 at a diffractive optical element array 1203. The diffractive optical elements split the input beam into multiple beams which are redirected by a second array of diffractive optical elements 1231 into parallel beams. Optics 1227 are used to image the beams onto each element of a light valve array 1208.

Figure 13:
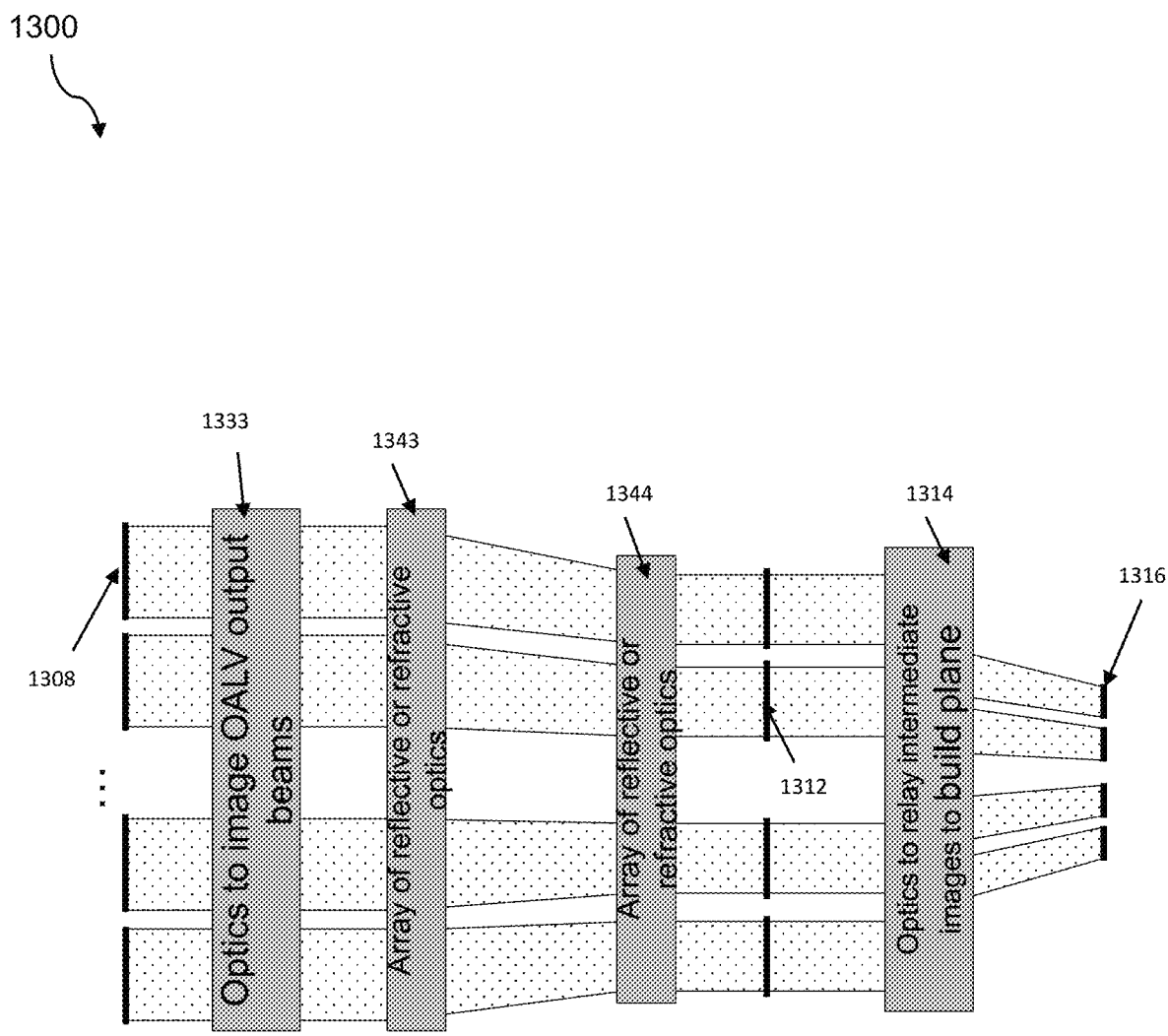
FIG. 13 illustrates a system to use arrays of refractive or reflective optics to shift and image the output from an M×N light valve array to form a distributed pattern of image tiles at the build plane.

FIG. 13 illustrates a system 1300 to use arrays of refractive or reflective optics to shift and image the output from an M×N light valve array to form a distributed pattern of image tiles at the build plane. In this embodiment, beams exiting from an M×N array of light valves 1308 are imaged by optics 1233 to an intermediate image plane 1312. The beams are shifted by two arrays of refractive or reflective optics 1343 and 1344 to form the desired pattern of images at the intermediate image plane 1312. If the optics in the arrays 1343 and 1344 have intrinsic optical power, the optics 1333 will not be needed to form the intermediate image. Optics 1314 image the beams to a build plane 1316.

Figure 14:
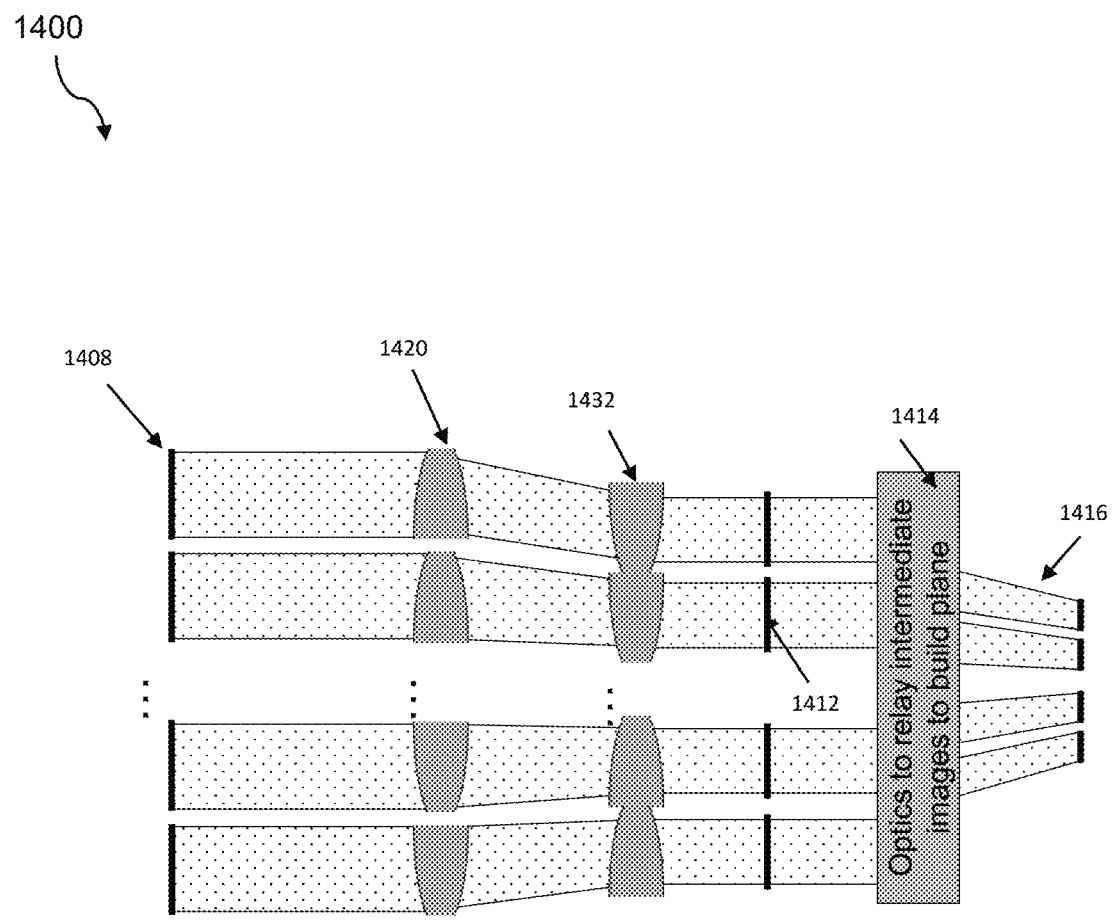
FIG. 14 illustrates a system to use arrays of lens segments to shift and image the output from an M×N light valve array to form a distributed pattern of image tiles at the build plane.

FIG. 14 illustrates a system 1400 to use arrays of lens segments to shift and image the output from an M×N light valve array to form a distributed pattern of image tiles at the build plane. The lenses used can be discrete lenses, lenticular optics, plenoptics optics, or integral optics. The materials used to fabricate the optics can be homogeneous or gradient index (GRIN) materials, or a metamaterial. A distributed pattern of tiles is shown at the final image, but the final image can also be a single composite image of all the tiles. Beams exiting from an M×N array of light valves 1408 are imaged and shifted by two arrays of lens segments 1420 and 1432 to form the desired pattern of images at an intermediate image plane 1412. Optics 1414 then image the beams to a build plane 1416.

Figure 15:
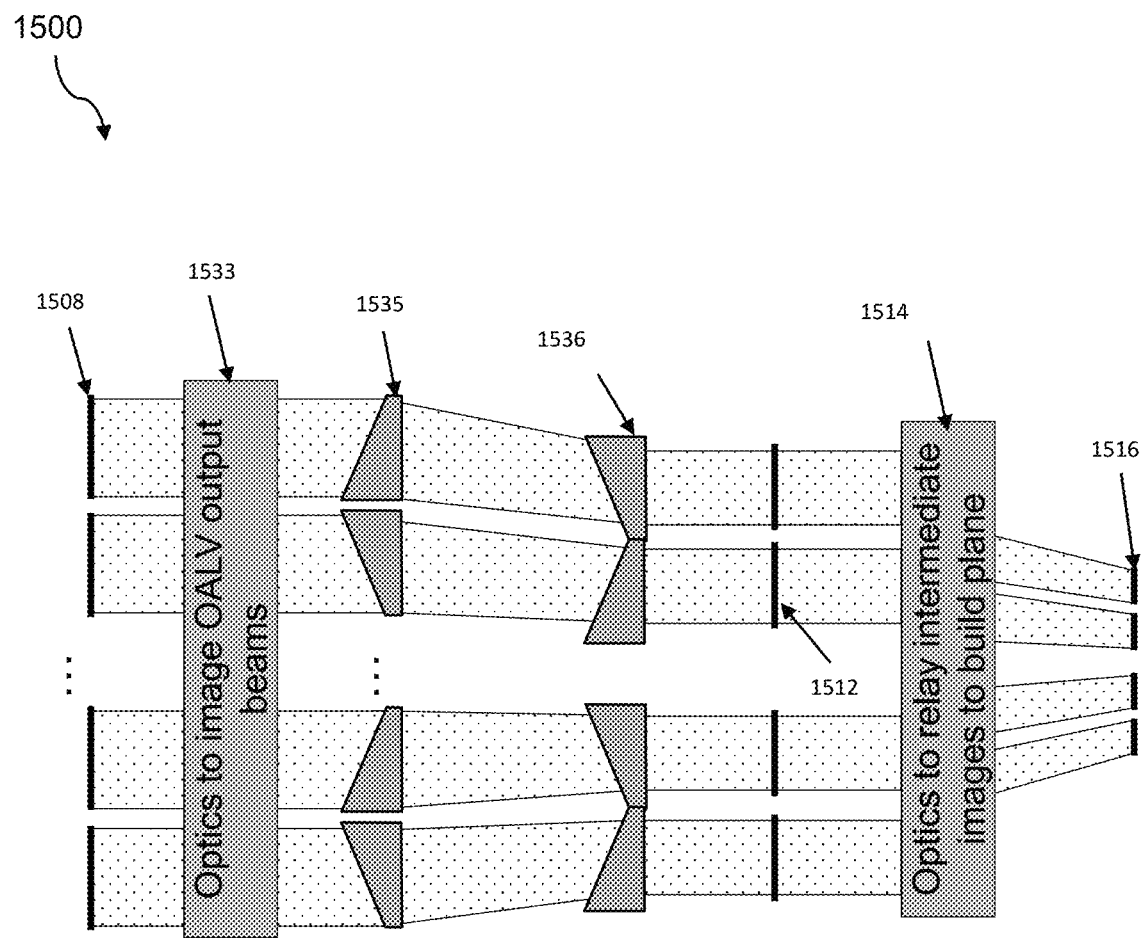
FIG. 15 illustrates a system to use arrays of prisms to shift and image the output from an M×N light valve array to form a distributed pattern of image tiles at the build plane.

FIG. 15 illustrates a system to use arrays of prisms to shift and image the output from an M×N light valve array to form a distributed pattern of image tiles at the build plane. Beams exiting from an M×N array of light valves 1508 is imaged to an intermediate image plane with optics 1533. Two arrays of prisms 1535 and 1536 shift the beams 1534 from the optics 1533 to form the desired pattern of images at an intermediate image plane 1512. Optics 1514 then image the beams at a build plane 1516.

Figure 16:
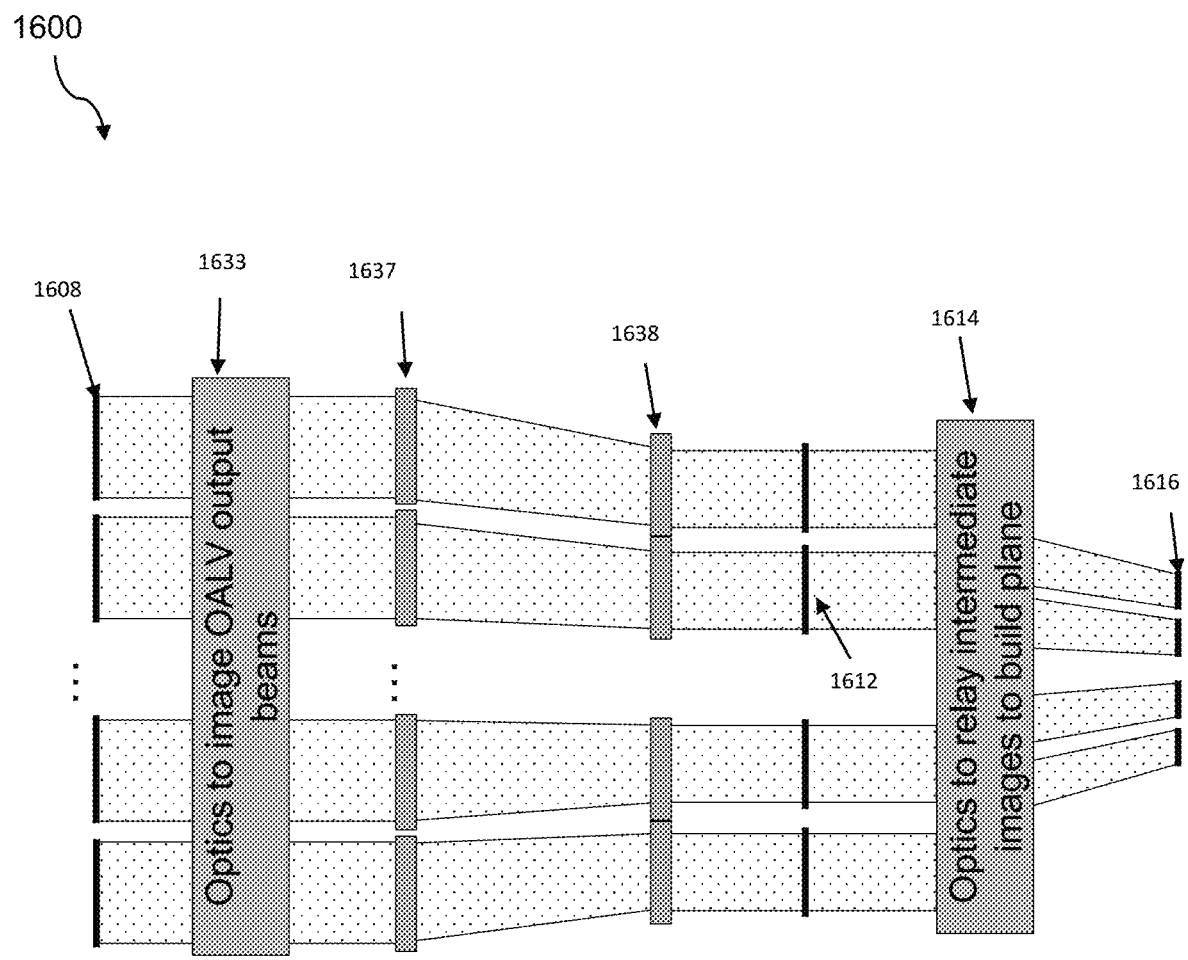
FIG. 16 illustrates a system to use arrays of diffractive or holographic optical elements to shift and image the output from an M×N light valve array to form a distributed pattern of image tiles at the build plane.

FIG. 16 illustrates a system 1600 to use arrays of diffractive or holographic optical elements to shift and image the output from an M×N light valve array to form a distributed pattern of image tiles at the build plane. These elements require coherence from the light sources to function properly. A distributed pattern of tiles is shown at the final image, but the final image can also be a single composite image of all the tiles. Beams exiting from an M×N array of light valves 1608 are imaged to an intermediate image plane with optics 1633. Two arrays of diffractive optical elements 1637 and 1638 shift the beams from the optics 1633 to form the desired pattern of images at an intermediate image plane 1612. Optics 1614 then image the beams at the build plane 1616. The optics 1633 will not be required if the diffractive or holographic elements in the arrays 1637 and 1638 have optical power.

Figure 17:
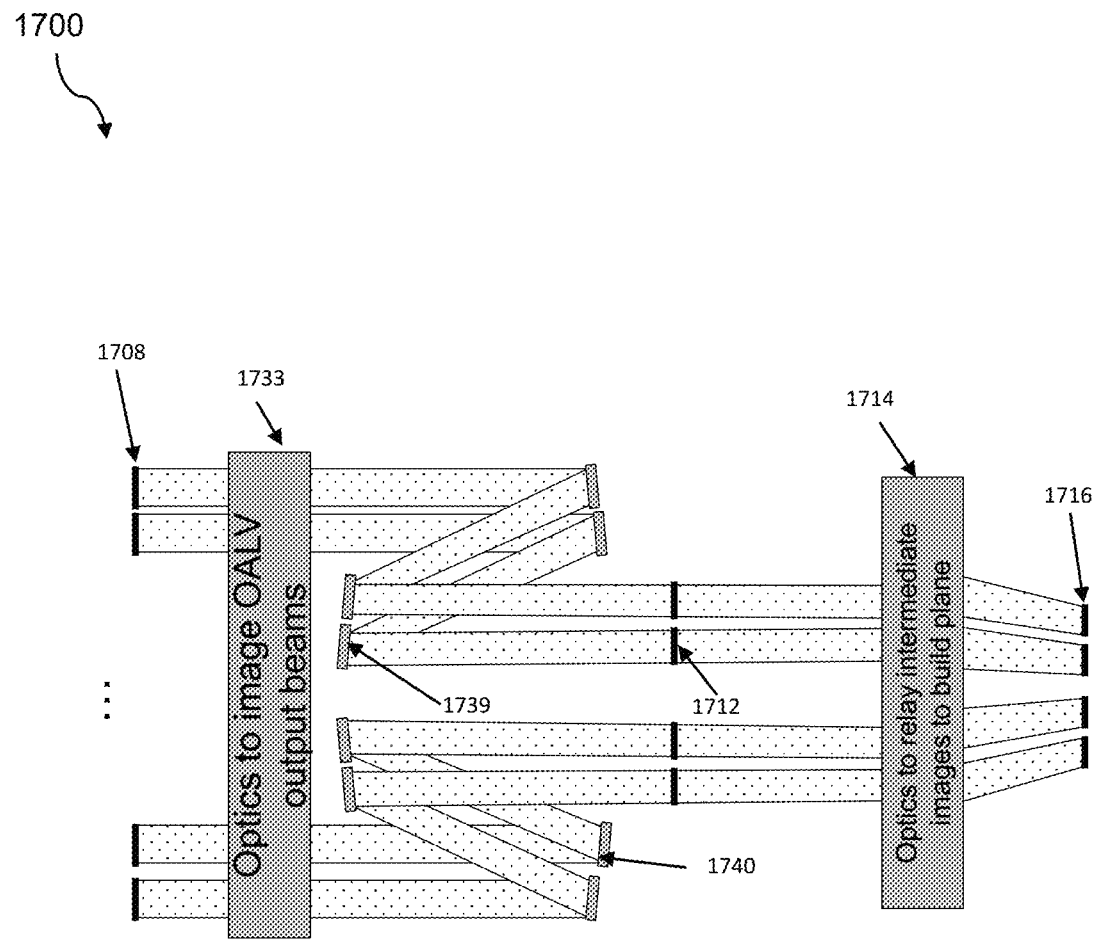
FIG. 17 illustrates a system to use arrays of mirrors to shift and image the output from an M×N light valve array to form a distributed pattern of image tiles at the build plane.

FIG. 17 illustrates a system 1700 to use arrays of mirrors to shift and image the output from an M×N light valve array to form a distributed pattern of image tiles at the build plane. Beams exiting from an M×N array of light valves 1708 is imaged to an intermediate image plane 1712 with optics 1733. Two arrays of mirrors 1739 and 1740 shift the beams from the optics 1733 to form the desired pattern of images at an intermediate image plane 1712. Optics 1714 then image the beams at a build plane 16. The optics 1733 will not be required if the mirrors in the arrays 1739 and 1740 have optical power.

Figure 18:
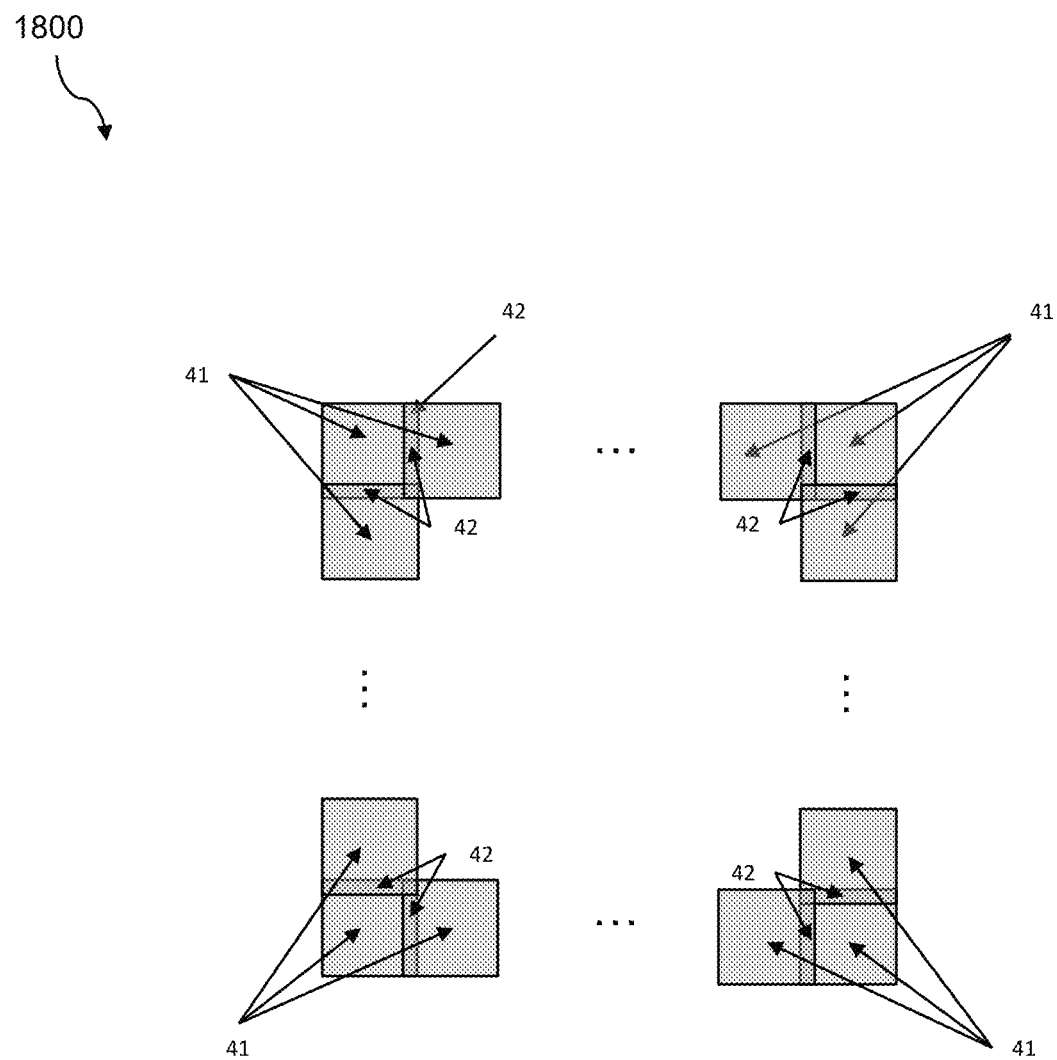
FIG. 18 illustrates an example of shifting all the light valve images to form a single composite tile at the build plane.

FIG. 18 illustrates an example 1800 of shifting all the light valve images to form a single composite tile at the build plane. In this example, images 1841 from an M×N array of light valves are arranged adjacent to each other to form a single composite tile. The relative overlap of the images 1842 can be adjusted for optimal print quality.

FIGS. 19A-D illustrate examples 1900 of printing with a distributed pattern of tiles. In this example, the images from a 2×2 array of light valves are arranged in a checkerboard pattern 1900A and printed at the build plane. The pattern is shifted then printed again for the image in 1900B. The pattern is shifted a second time and printed again in 1900C, and a final time in 1900D. The separation of the images (and therefore the tile edge overlap) can be adjusted for optimal print quality.

Figure 20:
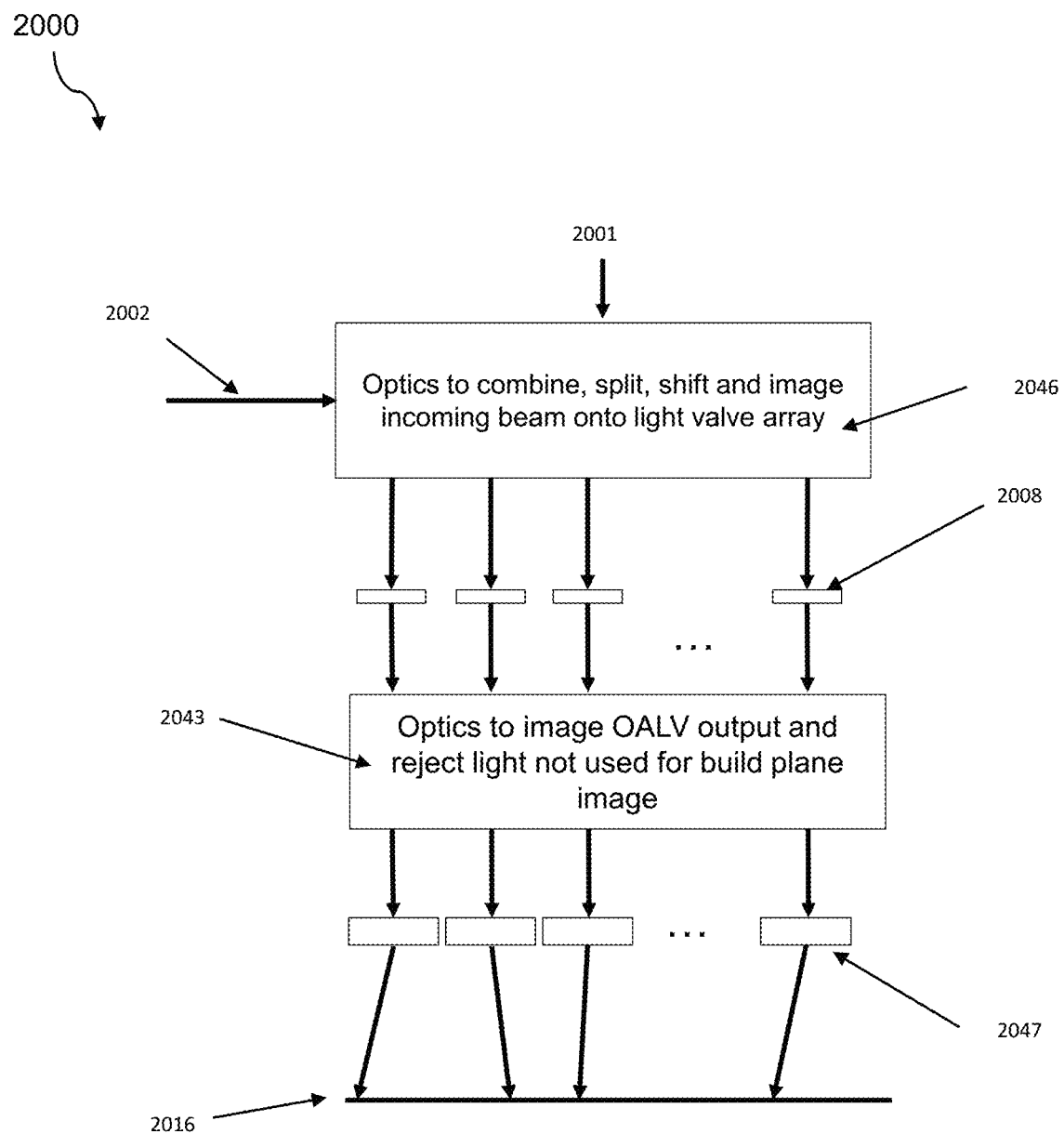
FIG. 20 illustrates a system having a transmissive light valve array with two sources, using image light valve output to build plane, and shift beams with individual beam steering units above the build plane.

FIG. 20 illustrates a system 2000 having a transmissive light valve array with two sources, using image light valve output to build plane, and shift beams with individual beam steering units above the build plane. The incoming illumination beams 2001 and 2002 are combined, split, and imaged by optics 2046 onto each element of the M×N light valve array 2008. If there is only one input beam 2001, the optics 2046 will split, shift, and image the single input beam 2001 onto each element of the M×N light valve array 2008. The optics 2043 image the beams from each element of the OALV array and reject unwanted light from each beam to form the final image at a build plane 2016. Individual beam steering units 2047 shift the beams to the desired positions at the build plane 2016. In some embodiments, separate optical systems are used to image the light valve output and reject light not use for the build plane image 2046, and in other embodiments, this operation is done as a single optical system (or beamline) and the splitting to individual beam steering units 2047 is done just before the print bed. In some embodiments, the individual beam steering units are mounted on a single platform above the print bed. In yet other embodiments, the platform is itself mounted to a gantry system composed of linear stages allowing translational movement above the print bed 2016 in one or two dimensions to cover its full area (traditionally referred to as X and Y directions, where Z is vertical). The beam steering 2047 units can be arrayed into a line, or into an M×N array to match the number of light valves 2008.

Figure 21:
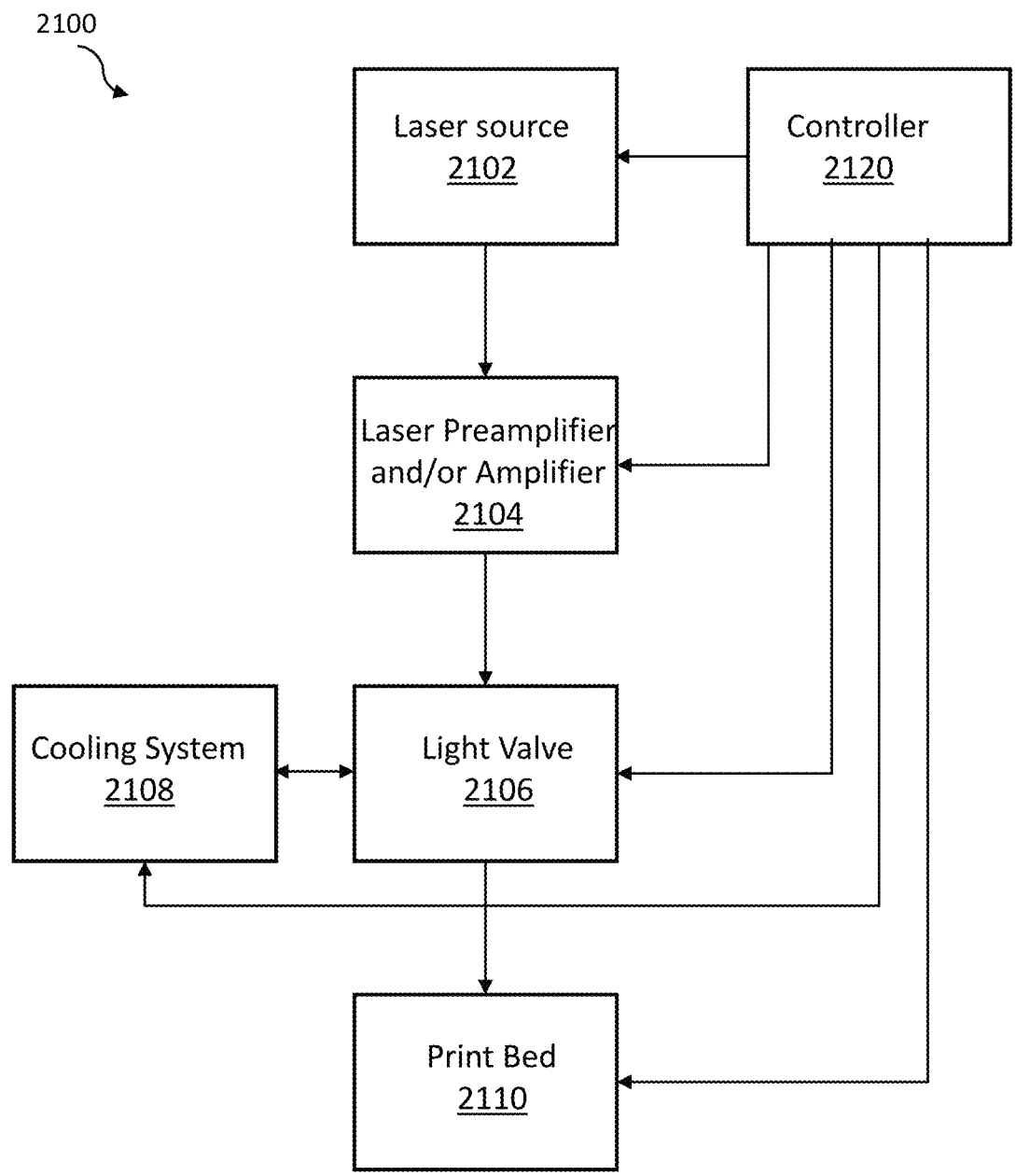
FIG. 21 illustrates a high fluence light valve based additive manufacturing system.

FIG. 21 illustrates use of a light valve based additive manufacturing system 2100. A laser source 2102 directs a laser beam through a laser preamplifier and/or amplifier 2104 into a light valve 2106. After patterning, light can be directed into a print bed 2110. The light valve 2106 can be attached to an additional active or passive cooling system 2108. Overall operation of the light valve based additive manufacturing system 2100 can controlled by one or more controllers 2120 that can modify laser power and timing.

In some embodiments, possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/$MnCl_2$) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate (Nd:$YVO_4$) laser, Neodymium doped yttrium calcium oxoborate Nd:$YCa_4O(BO_3)^3$ or simply Nd:YCOB, Neodymium glass (Nd:Glass) laser, Titanium sapphire (Ti:sapphire) laser, Thulium YAG (Tm:YAG) laser, Ytterbium YAG (Yb:YAG) laser, Ytterbium:$2O_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium) aluminum fluoride (Ce:LiSAF, Ce:LiCAF), Promethium 147 doped phosphate glass ($147Pm^{+3}$:Glass) solid-state laser, Chromium doped chrysoberyl (alexandrite) laser, Erbium doped anderbium-ytterbium co-doped glass lasers, Trivalent uranium doped calcium fluoride (U:$CaF_2$) solid-state laser, Divalent samarium doped calcium fluoride (Sm:$CaF_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

In some embodiments, various preamplifiers or amplifiers 2104 are optionally used to provide high gain to the laser signal, while optical modulators and isolators can be distributed throughout the system to reduce or avoid optical damage, improve signal contrast, and prevent damage to lower energy portions of the system 2100. Optical modulators and isolators can include, but are not limited to Pockels cells, Faraday rotators, Faraday isolators, acousto-optic reflectors, or volume Bragg gratings. Pre-amplifier or amplifiers 2104 could be diode pumped or flash lamp pumped amplifiers and configured in single and/or multi-pass or cavity type architectures. As will be appreciated, the term pre-amplifier here is used to designate amplifiers which are not limited thermally (i.e. they are smaller) versus laser amplifiers (larger). Amplifiers will typically be positioned to be the final units in a laser system 2100 and will be the first modules susceptible to thermal damage, including but not limited to thermal fracture or excessive thermal lensing.

Laser pre-amplifiers can include single pass pre-amplifiers usable in systems not overly concerned with energy efficiency. For more energy efficient systems, multi-pass pre-amplifiers can be configured to extract much of the energy from each pre-amplifier 2104 before going to the next stage. The number of pre-amplifiers 2102 needed for a particular system is defined by system requirements and the stored energy/gain available in each amplifier module. Multi-pass pre-amplification can be accomplished through angular multiplexing or polarization switching (e.g. using waveplates or Faraday rotators).

Alternatively, pre-amplifiers can include cavity structures with a regenerative amplifier type configuration. While such cavity structures can limit the maximum pulse length due to typical mechanical considerations (length of cavity), in some embodiments "white cell" cavities can be used. A "white cell" is a multi-pass cavity architecture in which a small angular deviation is added to each pass. By providing an entrance and exit pathway, such a cavity can be designed to have extremely large number of passes between entrance and exit allowing for large gain and efficient use of the amplifier. One example of a white cell would be a confocal cavity with beams injected slightly off axis and mirrors tilted such that the reflections create a ring pattern on the mirror after many passes. By adjusting the injection and mirror angles the number of passes can be changed.

Amplifiers are also used to provide enough stored energy to meet system energy requirements, while supporting sufficient thermal management to enable operation at system required repetition rate whether they are diode or flashlamp pumped.

Amplifiers can be configured in single and/or multi-pass or cavity type architectures. Amplifiers can include single pass amplifiers usable in systems not overly concerned with energy efficiency. For more energy efficient systems, multi-pass amplifiers can be configured to extract much of the energy from each amplifier before going to the next stage. The number of amplifiers needed for a particular system is defined by system requirements and the stored energy/gain available in each amplifier module. Multipass pre-amplification can be accomplished through angular multiplexing, polarization switching (waveplates, Faraday rotators). Alternatively, amplifiers can include cavity structures with a regenerative amplifier type configuration. As discussed with respect to pre-amplifiers, amplifiers can be used for power amplification.

In some embodiments, the cooling systems 2108 can include passive or active fluid pumping systems. Sensors can be used by controller 2120 to determine light transmission or laser light absorption characteristics. In some embodiments, waste heat can be used to increase temperature of connected components. As will be appreciated, laser flux and energy can be scaled in this architecture by adding more pre-amplifiers and amplifiers with appropriate thermal management and optical isolation. Adjustments to heat removal characteristics of the cooling system are possible, with increase in pump rate or changing cooling efficiency being used to adjust performance.

Figure 22:
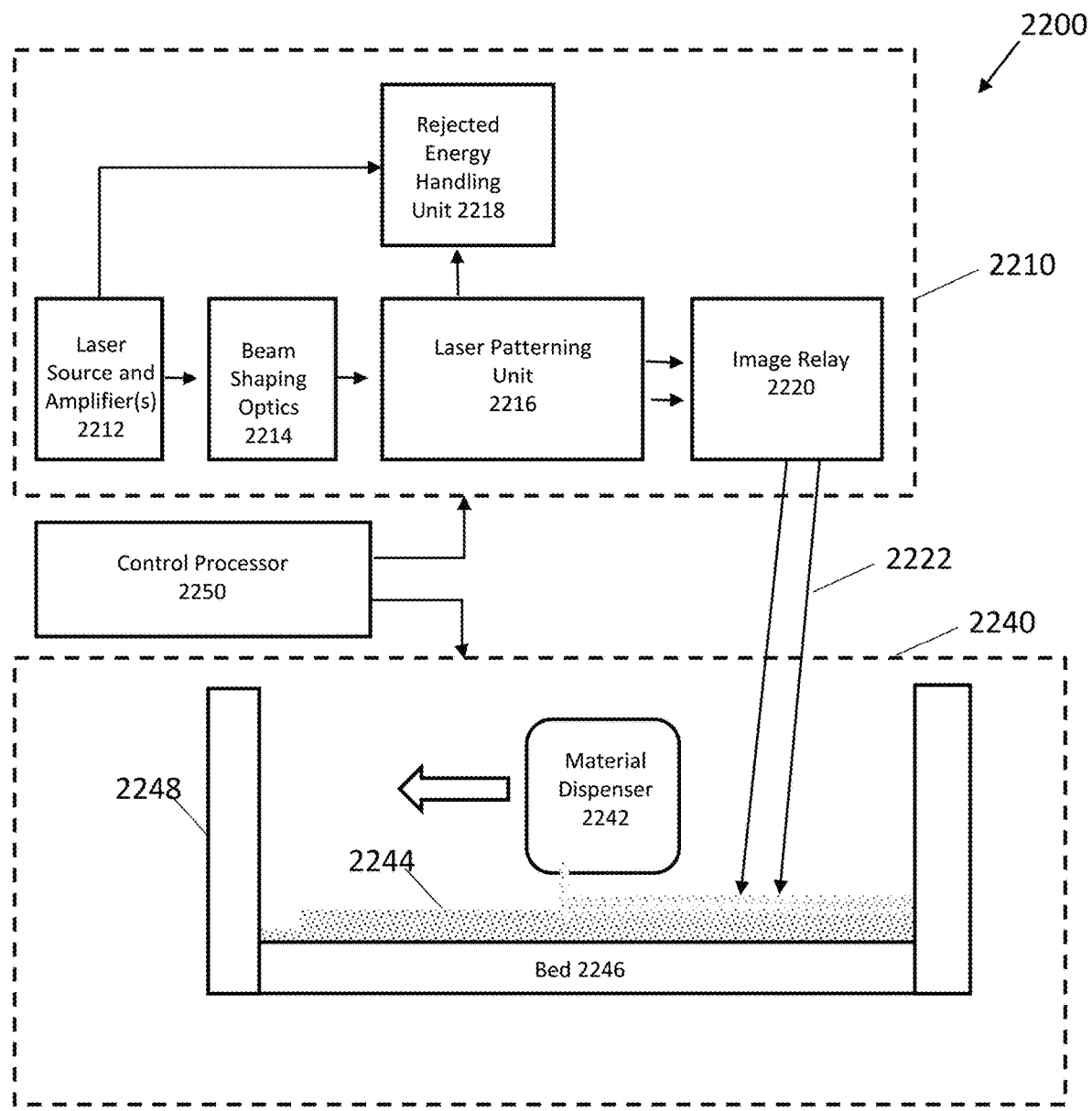
FIG. 22 illustrates another embodiment of a high fluence light valve based additive manufacturing system.

FIG. 22 illustrates use of a light valve based additive manufacturing system 2200. As seen in FIG. 22, a laser source and amplifier(s) 2212 can include cooled laser amplifiers and other components such as previously describe. As illustrated in FIG. 22, the additive manufacturing system 2200 uses lasers able to provide one or two dimensional directed energy as part of a laser patterning system 2210. In some embodiments, one dimensional patterning can be directed as linear or curved strips, as rastered lines, as spiral lines, or in any other suitable form. Two-dimensional patterning can include separated or overlapping tiles, or images with variations in laser intensity. Two-dimensional image patterns having non-square boundaries can be used, overlapping or interpenetrating images can be used, and images can be provided by two or more energy patterning systems. The laser patterning system 2210 uses laser source and amplifier(s) 2212 to direct one or more continuous or intermittent energy beam(s) toward beam shaping optics 2214. After shaping, if necessary, the beam is patterned by a laser patterning unit 2216 that includes either a transmissive or reflective light valve, with generally some energy being directed to a rejected energy handling unit 2218. Patterned energy is relayed by image relay 2220 toward an article processing unit 2240, in one embodiment as a two-dimensional image 2222 focused near a bed 2246. The bed 2246 (with optional walls 2248) can form a chamber containing material 2244 (e.g. a metal powder) dispensed by material dispenser 2242. Patterned energy, directed by the image relay 2220, can melt, fuse, sinter, amalgamate, change crystal structure, influence stress patterns, or otherwise chemically or physically modify the dispensed material 2244 to form structures with desired properties. A control processor 2250 can be connected to variety of sensors, actuators, heating or cooling systems, monitors, and controllers to coordinate operation of the laser source and amplifier(s) 2212, beam shaping optics 2214, laser patterning unit 2216, and image relay 2220, as well as any other component of system 2200. As will be appreciated, connections can be wired or wireless, continuous or intermittent, and include capability for feedback (for example, thermal heating can be adjusted in response to sensed temperature).

In some embodiments, beam shaping optics 2214 can include a great variety of imaging optics to combine, focus, diverge, reflect, refract, homogenize, adjust intensity, adjust frequency, or otherwise shape and direct one or more laser beams received from the laser source and amplifier(s) 2212 toward the laser patterning unit 2216. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Laser patterning unit 2216 can include static or dynamic energy patterning elements. For example, laser beams can be blocked by masks with fixed or movable elements. To increase flexibility and ease of image patterning, pixel addressable masking, image generation, or transmission can be used. In some embodiments, the laser patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning.

Rejected energy handling unit 2218 is used to disperse, redirect, or utilize energy not patterned and passed through the image relay 2220. In one embodiment, the rejected energy handling unit 2218 can include passive or active cooling elements that remove heat from both the laser source and amplifier(s) 2212 and the laser patterning unit 2216. In other embodiments, the rejected energy handling unit can include a "beam dump" to absorb and convert to heat any beam energy not used in defining the laser pattern. In still other embodiments, rejected laser beam energy can be recycled using beam shaping optics 2214. Alternatively, or in addition, rejected beam energy can be directed to the article processing unit 2240 for heating or further patterning.

In certain embodiments, rejected beam energy can be directed to additional energy patterning systems or article processing units.

In one embodiment, a "switchyard" style optical system can be used. Switchyard systems are suitable for reducing the light wasted in the additive manufacturing system as caused by rejection of unwanted light due to the pattern to be printed. A switchyard involves redirections of a complex pattern from its generation (in this case, a plane whereupon a spatial pattern is imparted to structured or unstructured beam) to its delivery through a series of switch points. Each switch point can optionally modify the spatial profile of the incident beam. The switchyard optical system may be utilized in, for example and not limited to, laser-based additive manufacturing techniques where a mask is applied to the light. Advantageously, in various embodiments in accordance with the present disclosure, the thrown-away energy may be recycled in either a homogenized form or as a patterned light that is used to maintain high power efficiency or high throughput rates. Moreover, the thrown-away energy can be recycled and reused to increase intensity to print more difficult materials.

Image relay 2220 can receive a patterned image (either one or two-dimensional) from the laser patterning unit 2216 directly or through a switchyard and guide it toward the article processing unit 2240. In a manner similar to beam shaping optics 2214, the image relay 2220 can include optics to combine, focus, diverge, reflect, refract, adjust intensity, adjust frequency, or otherwise shape and direct the patterned light. Patterned light can be directed using movable mirrors, prisms, diffractive optical elements, or solid state optical systems that do not require substantial physical movement. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto a desired location. Translational movements of compensating gantries and the build platform gantry are also able to ensure that distance of the incident light from the precursor mirror the article processing unit 2240 is substantially equivalent to the image distance. In effect, this enables a quick change in the optical beam delivery size and intensity across locations of a build area for different materials while ensuring high availability of the system.

Article processing unit 2240 can include a walled chamber 2248 and bed 2244 (collectively defining a build chamber), and a material dispenser 2242 for distributing material. The material dispenser 2242 can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 2246.

In addition to material handling components, the article processing unit 2240 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals). In some embodiments, various pure or mixtures of other atmospheres can be used, including those containing Ar, He, Ne, Kr, Xe, $CO_2$, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, $C_4H_{10}$, 1-$C_4H_8$, cic-2, $C_4H_7$, 1,3-$C_4H_6$, 1,2-$C_4H_6$, $C_5H_{12}$, n-$C_5H_{12}$, i- $C_5H_{12}$, n-$C_6H_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_6H_6$, $C_6H_5$-$CH_3$, $C_8H_{10}$, $C_2H_5OH$, $CH_3OH$, i$C_4H_8$. In some embodiments, refrigerants or large inert molecules (including but not limited to sulfur hexafluoride) can be used. An enclosure atmospheric composition to have at least about 1% He by volume (or number density), along with selected percentages of inert/non-reactive gasses can be used.

In certain embodiments, a plurality of article processing units or build chambers, each having a build platform to hold a powder bed, can be used in conjunction with multiple optical-mechanical assemblies arranged to receive and direct the one or more incident energy beams into the build chambers. Multiple chambers allow for concurrent printing of one or more print jobs inside one or more build chambers. In other embodiments, a removable chamber sidewall can simplify removal of printed objects from build chambers, allowing quick exchanges of powdered materials. The chamber can also be equipped with an adjustable process temperature controls. In still other embodiments, a build chamber can be configured as a removable printer cartridge positionable near laser optics. In some embodiments a removable printer cartridge can include powder or support detachable connections to a powder supply. After manufacture of an item, a removable printer cartridge can be removed and replaced with a fresh printer cartridge.

In another embodiment, one or more article processing units or build chambers can have a build chamber that is maintained at a fixed height, while optics are vertically movable. A distance between final optics of a lens assembly and a top surface of powder bed a may be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the ever changing mass of the build platform are not needed. Typically, build chambers intended for metal powders with a volume more than ~0.1-0.2 cubic meters (i.e., greater than 100-200 liters or heavier than 500-1,000 kg) will most benefit from keeping the build platform at a fixed height.

In one embodiment, a portion of the layer of the powder bed may be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

In some embodiments, the additive manufacturing system can include article processing units or build chambers with a build platform that supports a powder bed capable of tilting, inverting, and shaking to separate the powder bed substantially from the build platform in a hopper. The powdered material forming the powder bed may be collected in a hopper for reuse in later print jobs. The powder collecting process may be automated and vacuuming or gas jet systems also used to aid powder dislodgement and removal.

Some embodiments, the additive manufacturing system can be configured to easily handle parts longer than an available build chamber. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) may be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having an article processing units or build chamber contained within an enclosure, the build chamber being able to create a part having a weight greater than or equal to 2,000 kilograms. A gas management system may maintain gaseous oxygen within the enclosure at concentrations below the atmospheric level. In some embodiments, a wheeled vehicle may transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time from the powder bed. An ingester system is used for in-process collection and characterizations of powder samples. The collection may be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

Control processor 2250 can be connected to control any components of additive manufacturing system 2200 described herein, including lasers, laser amplifiers, optics, heat control, build chambers, and manipulator devices. The control processor 350 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 2250 is provided with an interface to allow input of manufacturing instructions. Use of a wide range of sensors allows various feedback control mechanisms that improve quality, manufacturing throughput, and energy efficiency.

Figure 23:
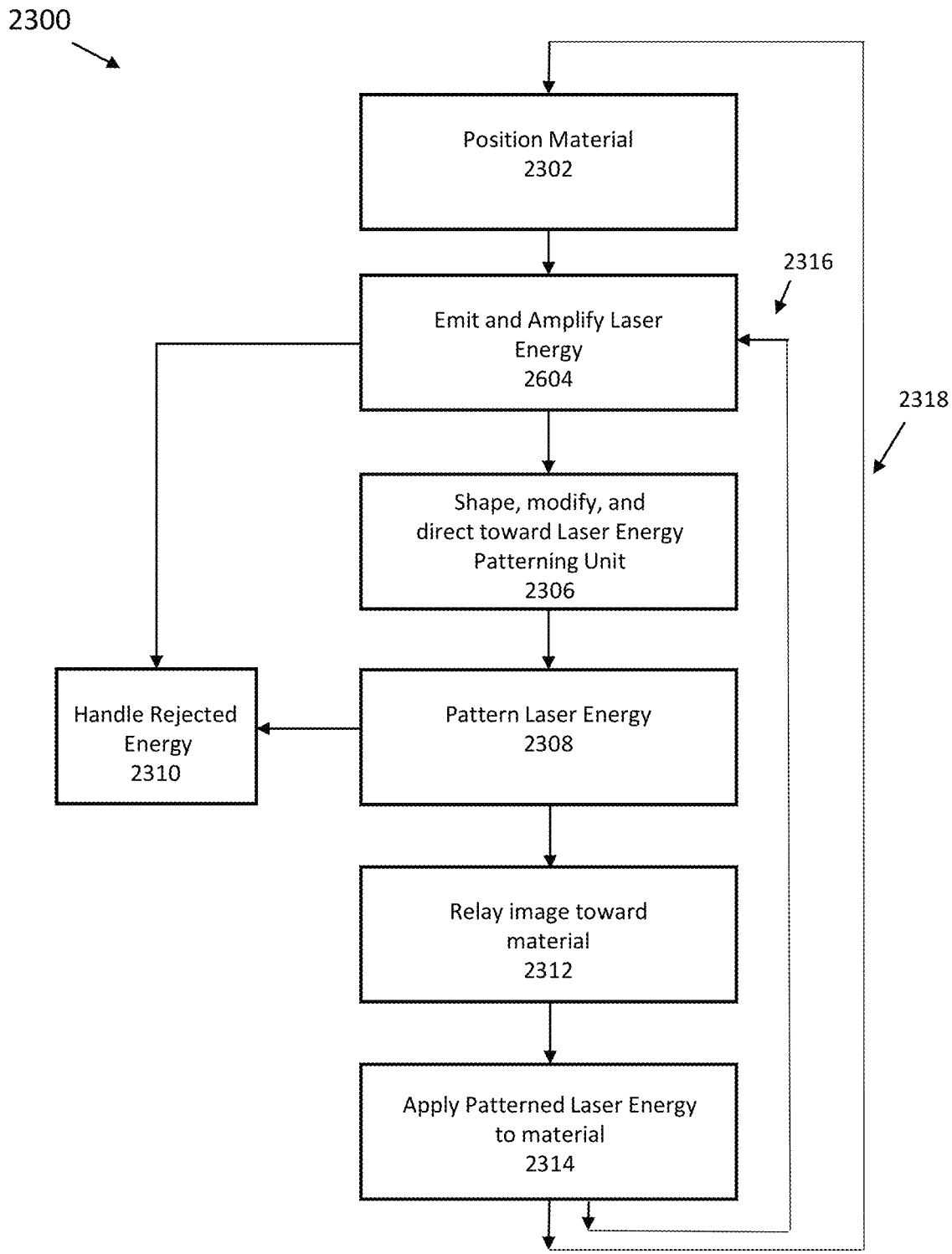
FIG. 23 illustrates operation of a high fluence light valve based additive manufacturing system.

One embodiment of operation of a manufacturing system suitable for additive or subtractive manufacture is illustrated in FIG. 23. In this embodiment, a flow chart 2300 illustrates one embodiment of a manufacturing process supported by the described optical and mechanical components. In step 2302, material is positioned in a bed, chamber, or other suitable support. The material can be a metal plate for laser cutting using subtractive manufacture techniques, or a powder capable of being melted, fused, sintered, induced to change crystal structure, have stress patterns influenced, or otherwise chemically or physically modified by additive manufacturing techniques to form structures with desired properties.

In step 2304, unpatterned laser energy is emitted by one or more energy emitters, including but not limited to solid state or semiconductor lasers, and then amplified by one or more laser amplifiers. In step 2306, the unpatterned laser energy is shaped and modified (e.g. intensity modulated or focused). In step 2308, this unpatterned laser energy is patterned, with energy not forming a part of the pattern being handled in step 2310 (this can include conversion to waste heat, recycling as patterned or unpatterned energy, or waste heat generated by cooling the laser amplifiers in step 2304). In step 2312, the patterned energy, now forming a one or two-dimensional image is relayed toward the material. In step 2314, the image is applied to the material, either subtractively processing or additively building a portion of a 3D structure. For additive manufacturing, these steps can be repeated (loop 2316) until the image (or different and subsequent image) has been applied to all necessary regions of a top layer of the material. When application of energy to the top layer of the material is finished, a new layer can be applied (loop 2318) to continue building the 3D structure. These process loops are continued until the 3D structure is complete, when remaining excess material can be removed or recycled.

Figure 24:
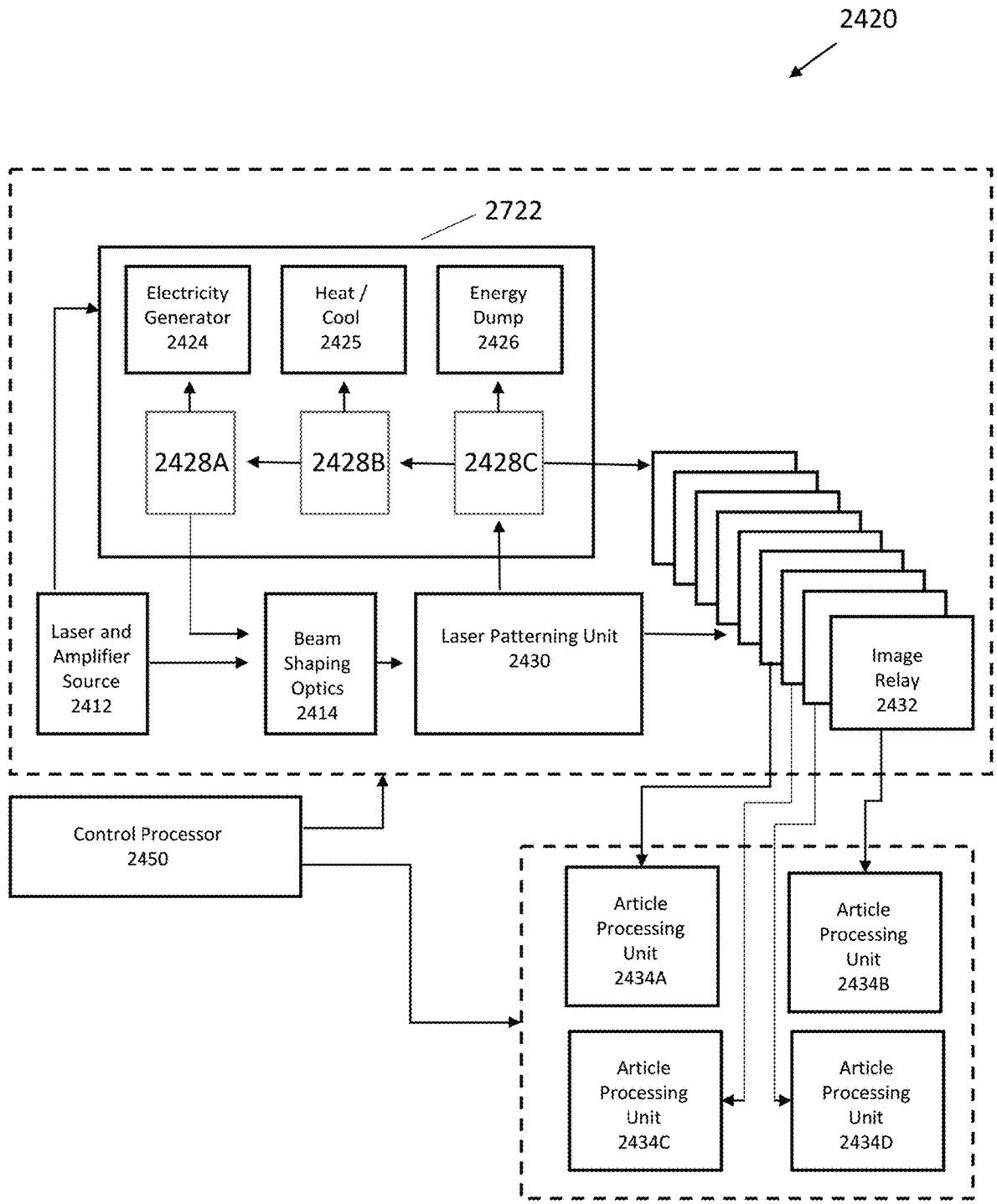
FIG. 24 illustrates another embodiment of a high fluence light valve based additive manufacturing which incorporates a switchyard approach for recovery and further usage of waste energy.

FIG. 24 is one embodiment of an additive manufacturing system that includes a switchyard system enabling reuse of patterned two-dimensional energy. An additive manufacturing system 2420 has an energy patterning system with a laser and amplifier source 2712 that directs one or more continuous or intermittent laser beam(s) toward beam shaping optics 2414. Excess heat can be transferred into a rejected energy handling unit 2422. After shaping, the beam is two-dimensionally patterned by an energy patterning unit 2430, with generally some energy being directed to the rejected energy handling unit 2422. Patterned energy is relayed by one of multiple image relays 2432 toward one or more article processing units 2434A, 2434B, 2434C, or 2434D, typically as a two-dimensional image focused near a movable or fixed height bed. The bed be inside a cartridge that includes a powder hopper or similar material dispenser. Patterned laser beams, directed by the image relays 2432, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Coolant fluid from the laser amplifier and source 2412 can be directed into one or more of an electricity generator 2424, a heat/cool thermal management system 2425, or an energy dump 2426. Additionally, relays 2428A, 2428B, and 2428C can respectively transfer energy to the electricity generator 2424, the heat/cool thermal management system 2425, or the energy dump 2426. Optionally, relay 2428C can direct patterned energy into the image relay 2432 for further processing. In other embodiments, patterned energy can be directed by relay 2428C, to relay 2428B and 2428A for insertion into the laser beam(s) provided by laser and amplifier source 2412. Reuse of patterned images is also possible using image relay 2432. Images can be redirected, inverted, mirrored, sub-patterned, or otherwise transformed for distribution to one or more article processing units 2434A-D. Advantageously, reuse of the patterned light can improve energy efficiency of the additive manufacturing process, and in some cases improve energy intensity directed at a bed or reduce manufacture time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. An additive manufacturing system, comprising:
   at least one laser source providing an illumination beam;
   a print bed;
   a light valve array having at least three optically addressable light valves (OALVs);
   first optics configured to split the illumination beam into multiple unpatterned beams and to direct the multiple unpatterned beams onto the at least three OALVs respectively, wherein each OALV patterns a respective image upon a respective unpatterned beam to be a patterned beam; and
   second optics configured to steer the patterned beams of the at least three OALVs at the print bed for printing an object,
   wherein the respective images patterned into the beams from the OALVs are arranged in a checkerboard pattern of tiles on the print bed, with each image being one tile in the checkerboard pattern;
   wherein the checkerboard pattern is shifted multiple times in different directions to result in a distributed pattern of tiles being printed on the print bed.

2. The additive manufacturing system of claim 1, wherein the images directed at the print bed are meshed or matched together at their edges to form a single image.

3. The additive manufacturing system of claim 1, wherein the images directed at the print bed are overlapped together at their edges to form a single image.

4. The additive manufacturing system of claim 1, wherein the at least one laser source further comprises at least two laser sources of different wavelength.

5. An additive manufacturing method, comprising:
providing a illumination beam from at least one laser source;
deriving at least three beams from the laser source;
using first optics to split the illumination beam into multiple unpatterned beams and to direct the multiple unpatterned beams onto at least three optically addressable light valves (OALVs) respectively, wherein each OALV patterns a respective image upon a respective unpatterned beam to be a patterned beam; and
using second optics to steer the patterned beams from the at least three OALVs at a print bed for printing an object,
wherein the respective images patterned into the beams from the OALVs are arranged in a checkerboard pattern of tiles on the print bed, with each image being one tile in the checkerboard pattern,
wherein the checkerboard pattern is shifted multiple times in different directions to result in a distributed pattern of tiles being printed on the print bed.

6. The additive manufacturing method of claim 5, wherein the images directed at the print bed are meshed or matched together at their edges to form a single image.

7. The additive manufacturing method of claim 5, wherein the images directed at the print bed are overlapped together at their edges to form a single image.

8. The additive manufacturing method of claim 5, wherein the at least one laser source further comprises at least two laser sources of different wavelength.

9. An additive manufacturing system, comprising:
multiple laser sources providing an illumination beam;
a print bed;
a light valve array having multiple optically addressable light valves (OALVs); and
first optics configured to split the illumination beam into multiple unpatterned beam and to direct the multiple unpatterned beams onto the multiple OALVs, wherein each OALV patterns a respective two-dimensional image upon a respective unpatterned beam; and
second optics configured to steer the patterned beams from the at least three OALVs at the print bed for printing an object,
wherein the respective images patterned into the beams from the OALVs are arranged in a checkerboard pattern of tiles on the print bed, with each image being one tile in the checkerboard pattern,
wherein the checkerboard pattern is shifted multiple times in different directions to result in a distributed pattern of tiles being printed on the print bed.

10. The additive manufacturing system of claim 9, wherein the first optics are configured to combine the multiple laser beams into the illumination beam.

11. The additive manufacturing system of claim 9, further comprising secondary optics configured to modify the two-dimensional images after interaction with the multiple optically addressable light valves.

12. The additive manufacturing system of claim 9, wherein at least some of the two-dimensional images from the light valve array are superimposed at the print bed.

13. An additive manufacturing method, comprising:
using multiple laser sources to provide an illumination beam;
using first optics to split the illumination beam into multiple unpatterned beam and to direct the multiple unpatterned beams onto multiple optically addressable light valves (OALVs) respectively, wherein each OALV patterns a respective two-dimensional image upon a respective unpatterned beam; and
using second optics to steer the patterned beams from the multiple OALVs at a print bed for printing an object,
wherein the respective images patterned into the beams from the multiple OALVs are arranged in a checkerboard pattern of tiles on the print bed, with each image being one tile in the checkerboard pattern,
wherein the checkerboard pattern is shifted multiple times in different directions to result in a distributed pattern of tiles being printed on the print bed.

14. The additive manufacturing method of claim 13, wherein the first optics are configured to combine the multiple laser beams into the illumination beam.

15. The additive manufacturing method of claim 13, further comprising modifying the two-dimensional images by secondary optics after interaction with the multiple optically addressable light valves.

16. The additive manufacturing method of claim 13, wherein at least some of the two-dimensional images from the light valve array are superimposed at the print bed.

* * * * *